United States Patent
Hardt

(10) Patent No.: US 9,245,266 B2
(45) Date of Patent: Jan. 26, 2016

(54) AUDITABLE PRIVACY POLICIES IN A DISTRIBUTED HIERARCHICAL IDENTITY MANAGEMENT SYSTEM

(75) Inventor: Dick C. Hardt, Vancouver (CA)

(73) Assignee: CALLAHAN CELLULAR L.L.C., Wilmington, DE (US)

( * ) Notice: Subject to any disclaimer, the term of this patent is extended or adjusted under 35 U.S.C. 154(b) by 0 days.

(21) Appl. No.: 10/867,768

(22) Filed: Jun. 16, 2004

(65) Prior Publication Data

US 2005/0283443 A1  Dec. 22, 2005

(51) Int. Cl.
| | |
|---|---|
| *G06Q 20/00* | (2012.01) |
| *G06Q 20/38* | (2012.01) |
| *H04L 9/32* | (2006.01) |
| *G06Q 20/36* | (2012.01) |
| *H04L 29/06* | (2006.01) |

(52) U.S. Cl.
CPC .............. *G06Q 20/382* (2013.01); *H04L 9/321* (2013.01); *H04L 9/3247* (2013.01); *H04L 9/3263* (2013.01); *H04L 63/0815* (2013.01); *H04L 63/12* (2013.01); *G06Q 20/3674* (2013.01); *H04L 63/08* (2013.01); *H04L 2209/38* (2013.01); *H04L 2209/68* (2013.01); *H04L 2209/76* (2013.01)

(58) Field of Classification Search
CPC ............. G06F 11/30; G06F 7/04; G06F 7/58; H04L 9/00; H04K 1/00; G06Q 20/382
USPC ............ 705/26, 77, 52, 1; 713/200, 201, 177, 713/158; 380/28; 709/229
See application file for complete search history.

(56) References Cited

U.S. PATENT DOCUMENTS

| | | | |
|---|---|---|---|
| 3,837,501 A | | 9/1974 | Pielkenrood |
| 4,067,813 A | | 1/1978 | Pielkenrood |
| 4,437,988 A | | 3/1984 | James |
| 4,713,753 A | | 12/1987 | Boebert et al. |
| 4,759,063 A | * | 7/1988 | Chaum ........................... 380/30 |
| 4,759,064 A | * | 7/1988 | Chaum ........................... 380/30 |
| 4,780,821 A | | 10/1988 | Crossley |
| 4,799,156 A | * | 1/1989 | Shavit et al. ................. 705/26.3 |
| 4,914,698 A | * | 4/1990 | Chaum ........................... 380/30 |
| 4,949,380 A | * | 8/1990 | Chaum ........................... 380/30 |
| 4,991,210 A | * | 2/1991 | Chaum ........................... 380/30 |
| 5,487,826 A | * | 1/1996 | Back et al. ................. 206/308.3 |
| 5,644,723 A | | 7/1997 | Deaton et al. |

(Continued)

FOREIGN PATENT DOCUMENTS

| | | |
|---|---|---|
| AU | 2003240323 A1 | 12/2003 |
| CA | 2222480 A1 | 7/1998 |

(Continued)

OTHER PUBLICATIONS http://www.w3.org/P3P/.*

(Continued)

*Primary Examiner* — Calvin L Hewitt, II
*Assistant Examiner* — Margaret Neubig
(74) *Attorney, Agent, or Firm* — Perkins Coie LLP

(57) ABSTRACT

A set of methods, and systems, for enabling the audit tracking of user agreement with policies, such as privacy policies in an authenticated fashion is disclosed herein. The method and system make use of third party signatures of privacy policies to show user approval of the policy as it pertains to released data.

20 Claims, 9 Drawing Sheets

(56) References Cited

U.S. PATENT DOCUMENTS

| | | | |
|---|---|---|---|
| 5,677,955 A | 10/1997 | Doggett et al. | |
| 5,737,701 A | 4/1998 | Rosenthal et al. | |
| 5,774,551 A | 6/1998 | Wu et al. | |
| 5,781,629 A * | 7/1998 | Haber et al. | 713/177 |
| 5,794,207 A * | 8/1998 | Walker et al. | 705/77 |
| 5,794,259 A | 8/1998 | Kikinis | |
| 5,815,665 A | 9/1998 | Teper et al. | |
| 5,855,007 A | 12/1998 | Jovicic et al. | |
| 5,872,850 A | 2/1999 | Klein et al. | |
| 5,875,296 A * | 2/1999 | Shi et al. | 713/202 |
| 5,903,721 A * | 5/1999 | Sixtus | 726/2 |
| 5,911,141 A | 6/1999 | Kelley et al. | |
| 5,930,479 A | 7/1999 | Hall | |
| 5,953,710 A | 9/1999 | Fleming | |
| 5,983,208 A | 11/1999 | Haller et al. | |
| 5,995,965 A | 11/1999 | Experton | |
| 6,005,939 A | 12/1999 | Fortenberry et al. | |
| 6,009,410 A | 12/1999 | LeMole et al. | |
| 6,012,044 A | 1/2000 | Maggioncalda et al. | |
| 6,026,166 A * | 2/2000 | LeBourgeois | 713/156 |
| 6,029,141 A | 2/2000 | Bezos et al. | |
| 6,052,710 A | 4/2000 | Saliba et al. | |
| 6,061,790 A * | 5/2000 | Bodnar | 713/171 |
| 6,073,106 A | 6/2000 | Rozen et al. | |
| 6,073,241 A * | 6/2000 | Rosenberg et al. | 713/201 |
| 6,092,196 A * | 7/2000 | Reiche | 726/6 |
| 6,125,352 A | 9/2000 | Franklin et al. | |
| 6,131,096 A | 10/2000 | Ng et al. | |
| 6,154,768 A | 11/2000 | Chen et al. | |
| 6,192,380 B1 | 2/2001 | Light et al. | |
| 6,199,079 B1 | 3/2001 | Gupta et al. | |
| 6,208,659 B1 | 3/2001 | Govindarajan et al. | |
| 6,233,608 B1 | 5/2001 | Laursen et al. | |
| 6,243,688 B1 | 6/2001 | Kalina | |
| 6,247,029 B1 | 6/2001 | Kelley et al. | |
| 6,253,203 B1 | 6/2001 | O'Flaherty et al. | |
| 6,266,692 B1 | 7/2001 | Greenstein | |
| 6,285,983 B1 | 9/2001 | Jenkins | |
| 6,289,333 B1 | 9/2001 | Jawahar et al. | |
| 6,298,347 B1 | 10/2001 | Wesley | |
| 6,308,203 B1 | 10/2001 | Itabashi et al. | |
| 6,321,339 B1 | 11/2001 | French et al. | |
| 6,327,578 B1 | 12/2001 | Linehan | |
| 6,353,852 B1 | 3/2002 | Nestoriak, III et al. | |
| 6,356,905 B1 | 3/2002 | Gershman et al. | |
| 6,381,597 B1 | 4/2002 | Lin | |
| 6,385,596 B1 | 5/2002 | Wiser et al. | |
| 6,401,085 B1 | 6/2002 | Gershman et al. | |
| 6,421,768 B1 | 7/2002 | Purpura | |
| 6,491,217 B2 | 12/2002 | Catan | |
| 6,496,855 B1 | 12/2002 | Hunt et al. | |
| 6,571,279 B1 | 5/2003 | Herz et al. | |
| 6,571,285 B1 | 5/2003 | Groath et al. | |
| 6,584,448 B1 | 6/2003 | Laor | |
| 6,605,224 B2 | 8/2003 | Aymong | |
| 6,606,643 B1 | 8/2003 | Emens et al. | |
| 6,609,198 B1 | 8/2003 | Wood et al. | |
| 6,629,081 B1 * | 9/2003 | Cornelius et al. | 705/30 |
| 6,651,090 B1 | 11/2003 | Itabashi et al. | |
| 6,665,704 B1 | 12/2003 | Singh | |
| 6,668,322 B1 | 12/2003 | Wood et al. | |
| 6,708,205 B2 | 3/2004 | Sheldon et al. | |
| 6,714,916 B1 | 3/2004 | Robertson et al. | |
| 6,725,050 B1 | 4/2004 | Cook | |
| 6,751,735 B1 * | 6/2004 | Schell et al. | 713/189 |
| 6,845,370 B2 | 1/2005 | Burkey et al. | |
| 6,865,426 B1 | 3/2005 | Schneck et al. | |
| 6,879,965 B2 | 4/2005 | Fung et al. | |
| 6,907,401 B1 * | 6/2005 | Vittal et al. | 705/26.2 |
| 6,944,677 B1 | 9/2005 | Zhao | |
| 6,957,334 B1 | 10/2005 | Goldstein et al. | |
| 7,016,875 B1 | 3/2006 | Steele et al. | |
| 7,016,877 B1 | 3/2006 | Steele et al. | |
| 7,054,906 B2 | 5/2006 | Levosky | |
| 7,076,558 B1 | 7/2006 | Dunn | |
| 7,089,208 B1 | 8/2006 | Levchin et al. | |
| 7,100,195 B1 | 8/2006 | Underwood | |
| 7,197,539 B1 | 3/2007 | Cooley | |
| 7,216,292 B1 | 5/2007 | Snapper et al. | |
| 7,257,581 B1 | 8/2007 | Steele et al. | |
| 7,289,971 B1 | 10/2007 | O'Neil et al. | |
| 7,343,351 B1 | 3/2008 | Bishop et al. | |
| 7,380,271 B2 | 5/2008 | Moran et al. | |
| 7,454,623 B2 | 11/2008 | Hardt | |
| 7,467,141 B1 | 12/2008 | Steele et al. | |
| 7,487,130 B2 | 2/2009 | Steele et al. | |
| 7,496,751 B2 * | 2/2009 | de Jong | G06F 21/33 713/155 |
| 7,546,349 B1 | 6/2009 | Cooley | |
| 7,610,391 B2 | 10/2009 | Dunn | |
| 7,783,741 B2 | 8/2010 | Hardt | |
| 7,793,095 B2 | 9/2010 | Hardt | |
| 7,827,115 B2 * | 11/2010 | Weller et al. | 705/78 |
| 2001/0011250 A1 | 8/2001 | Paltenghe et al. | |
| 2001/0018660 A1 | 8/2001 | Sehr | |
| 2001/0018675 A1 * | 8/2001 | Blaze et al. | 705/35 |
| 2001/0039586 A1 | 11/2001 | Primak et al. | |
| 2001/0047276 A1 | 11/2001 | Eisenhart | |
| 2002/0002684 A1 | 1/2002 | Fox et al. | |
| 2002/0016721 A1 | 2/2002 | Mason et al. | |
| 2002/0029201 A1 | 3/2002 | Barzilai et al. | |
| 2002/0049912 A1 * | 4/2002 | Honjo | G06F 21/335 726/10 |
| 2002/0062262 A1 * | 5/2002 | Vasconi et al. | 705/26 |
| 2002/0078233 A1 | 6/2002 | Biliris et al. | |
| 2002/0087641 A1 | 7/2002 | Levosky | |
| 2002/0091745 A1 | 7/2002 | Ramamurthy et al. | |
| 2002/0091798 A1 | 7/2002 | Joshi et al. | |
| 2002/0099671 A1 | 7/2002 | Mastin et al. | |
| 2002/0107807 A1 | 8/2002 | Ketonen et al. | |
| 2002/0107972 A1 | 8/2002 | Keane | |
| 2002/0112083 A1 | 8/2002 | Joshi et al. | |
| 2002/0112155 A1 | 8/2002 | Martherus et al. | |
| 2002/0112185 A1 | 8/2002 | Hodges et al. | |
| 2002/0116642 A1 | 8/2002 | Joshi et al. | |
| 2002/0120599 A1 | 8/2002 | Knouse et al. | |
| 2002/0138581 A1 | 9/2002 | MacIntosh et al. | |
| 2002/0152179 A1 | 10/2002 | Racov | |
| 2002/0154157 A1 | 10/2002 | Sherr et al. | |
| 2002/0165960 A1 | 11/2002 | Chan et al. | |
| 2002/0174369 A1 | 11/2002 | Miyazaki et al. | |
| 2002/0178365 A1 | 11/2002 | Yamaguchi | |
| 2002/0194138 A1 | 12/2002 | Dominguez et al. | |
| 2002/0198818 A1 | 12/2002 | Scott et al. | |
| 2002/0199095 A1 | 12/2002 | Bandini et al. | |
| 2003/0018587 A1 | 1/2003 | Althoff et al. | |
| 2003/0033528 A1 * | 2/2003 | Ozog et al. | 713/170 |
| 2003/0074580 A1 | 4/2003 | Knouse et al. | |
| 2003/0079123 A1 * | 4/2003 | Mas Ribes | 713/156 |
| 2003/0110397 A1 | 6/2003 | Supramaniam et al. | |
| 2003/0130960 A1 | 7/2003 | Fraser et al. | |
| 2003/0131232 A1 | 7/2003 | Fraser et al. | |
| 2003/0135732 A1 * | 7/2003 | Vaha-Sipila | 713/156 |
| 2003/0149781 A1 * | 8/2003 | Yared et al. | 709/229 |
| 2003/0154306 A1 | 8/2003 | Perry | |
| 2003/0158960 A1 * | 8/2003 | Engberg | 709/237 |
| 2003/0163733 A1 | 8/2003 | Barriga-Caceres et al. | |
| 2003/0204725 A1 | 10/2003 | Itoi et al. | |
| 2003/0208684 A1 | 11/2003 | Camacho et al. | |
| 2003/0225841 A1 | 12/2003 | Song et al. | |
| 2003/0229783 A1 | 12/2003 | Hardt | |
| 2004/0008666 A1 | 1/2004 | Hardjono | |
| 2004/0010697 A1 | 1/2004 | White | |
| 2004/0049677 A1 | 3/2004 | Lee et al. | |
| 2004/0103324 A1 | 5/2004 | Band | |
| 2004/0128558 A1 | 7/2004 | Barrett | |
| 2004/0143750 A1 | 7/2004 | Kulack et al. | |
| 2004/0162786 A1 * | 8/2004 | Cross et al. | 705/59 |
| 2004/0177110 A1 | 9/2004 | Rounthwaite et al. | |
| 2004/0181665 A1 * | 9/2004 | Houser | 713/158 |
| 2004/0205243 A1 | 10/2004 | Hurvig et al. | |
| 2004/0225883 A1 | 11/2004 | Weller et al. | |
| 2004/0243823 A1 | 12/2004 | Moyer et al. | |
| 2004/0255117 A1 | 12/2004 | Paatero et al. | |

(56) References Cited

U.S. PATENT DOCUMENTS

| | | | |
|---|---|---|---|
| 2005/0005110 A1 | 1/2005 | Kim et al. | |
| 2005/0010653 A1 | 1/2005 | McCanne | |
| 2005/0015340 A1* | 1/2005 | Maes | 705/44 |
| 2005/0114453 A1 | 5/2005 | Hardt | |
| 2005/0171811 A1 | 8/2005 | Campbell et al. | |
| 2005/0210107 A1 | 9/2005 | Mora | |
| 2005/0210244 A1 | 9/2005 | Stevens et al. | |
| 2005/0283614 A1 | 12/2005 | Hardt | |
| 2006/0005019 A1 | 1/2006 | Chao | |
| 2006/0005020 A1 | 1/2006 | Hardt | |
| 2006/0005263 A1 | 1/2006 | Hardt | |
| 2006/0031489 A1 | 2/2006 | Marcjan | |
| 2006/0106734 A1 | 5/2006 | Hoffman et al. | |
| 2006/0179003 A1 | 8/2006 | Steele et al. | |
| 2006/0200425 A1 | 9/2006 | Steele et al. | |
| 2006/0229944 A1 | 10/2006 | Walker et al. | |
| 2007/0130460 A1* | 6/2007 | Pfitzmann | G06F 21/6263 713/168 |
| 2007/0143860 A1 | 6/2007 | Hardt | |
| 2007/0277034 A1 | 11/2007 | LiVecchi | |
| 2007/0282733 A1 | 12/2007 | May | |
| 2008/0010298 A1 | 1/2008 | Steele et al. | |
| 2009/0125429 A1 | 5/2009 | Takayama | |
| 2009/0157531 A1 | 6/2009 | Bui | |
| 2009/0210293 A1 | 8/2009 | Steele et al. | |
| 2010/0306830 A1 | 12/2010 | Hardt | |

FOREIGN PATENT DOCUMENTS

| | | |
|---|---|---|
| CA | 2245293 A1 | 9/1999 |
| CA | 2458257 A1 | 9/2003 |
| CA | 2447121 A1 | 1/2004 |
| CA | 2431311 A1 | 5/2004 |
| CA | 2468351 A1 | 8/2004 |
| CA | 2468585 A1 | 8/2004 |
| CA | 2493897 A1 | 4/2005 |
| CA | 2494225 A1 | 4/2005 |
| CN | 1289974 A | 4/2001 |
| EP | 1089516 | 4/2001 |
| EP | 1089518 A2 | 4/2001 |
| EP | 1223527 A2 | 7/2002 |
| EP | 1316016 | 6/2003 |
| EP | 1316028 | 6/2003 |
| EP | 1316041 | 6/2003 |
| EP | 1388986 A1 | 2/2004 |
| EP | 1520217 A2 | 4/2005 |
| EP | 1766840 A1 | 3/2007 |
| EP | 1766852 A1 | 3/2007 |
| EP | 1766853 A1 | 3/2007 |
| EP | 1766863 A1 | 3/2007 |
| FR | 1098155 A | 7/1955 |
| JP | 11282804 A | 10/1999 |
| JP | 2001186122 A | 7/2001 |
| JP | 2003071960 A | 3/2003 |
| JP | 2003323408 A | 11/2003 |
| JP | 2005529392 T | 9/2005 |
| WO | WO-0067415 A2 | 11/2000 |
| WO | WO-0146783 A2 | 6/2001 |
| WO | WO-0167364 A1 | 9/2001 |
| WO | WO-0201462 | 1/2002 |
| WO | WO-0205092 | 1/2002 |
| WO | WO-0205103 | 1/2002 |
| WO | WO-0205139 | 1/2002 |
| WO | WO-0205185 | 1/2002 |
| WO | WO-0205487 | 1/2002 |
| WO | WO-03046748 | 6/2003 |
| WO | WO-03098898 A1 | 11/2003 |
| WO | WO-03104947 A2 | 12/2003 |
| WO | WO-2005048544 A1 | 5/2005 |
| WO | WO-2005125077 A1 | 12/2005 |
| WO | WO-2005125086 A1 | 12/2005 |
| WO | WO-2005125087 A1 | 12/2005 |
| WO | WO-2005125096 A1 | 12/2005 |
| ZM | 200500060 | 3/2006 |

OTHER PUBLICATIONS

Lopez et al., "Ubiquitous Internet Access Control: the PAPI system", *Proceedings of the 13th International Workshop on Database and Expert Systems Applications* (*DEXA*' 02), pp. 1-5.

Kormann et al., "Risks of the Passport single signon protocol", *Computer Networks*, vol. 33, Jun. 2000, pp. 51-58.

Chu et al., "Web-Based Single Sign-On Solutions: An SSO Product Matrix", *Computer Security Journal*, vol. 16, Nov. 1, 2000, pp. 39-49, XP008021056.

Asaravala, "A Question of Identity Passport, Liberty and the Single Sign-On Race", www.newarchitectmag.com, Jan. 31, 2003, pp. 22-24, XP009022582.

Erdos et al., "Shibboleth-Architecture DRAFT v05", draft-internet2-shibboleth-architecutre-05.html, May 2, 2002, XP002264221.

"Notice of Allowance", U.S. Appl. No. 10/867,635, (Jun. 20, 2008), 4 pages.

"Non Final Office Action", U.S. Appl. No. 10/867,635, (Nov. 21, 2007), 5 pages.

Final Office Action for U.S. Appl. No. 11/039,886; Mailed on Nov. 8, 2011; 56 pages.

Restriction Requirement for U.S. Appl. No. 12/434,803; Mailed on Nov. 14, 2011; 7 pages.

Final Office Action for U.S. Appl. No. 11/824,358; Mailed on Nov. 15, 2011; 35 pages.

Notice of Allowance for U.S. Appl. No. 12/851,464; Mailed Oct. 5, 2011; 41 pgs.

Non-Final Office Action for U.S. Appl. No. 09/988,811; Mailed Oct. 14, 2011; 34 pgs.

U.S. Appl. No. 09/988,811, filed Nov. 20, 2001, Steele et al.

"724 Solutions-Products-Financial Services," www.724.com, Sep. 25, 2001, 1 page.

"724 Solutions-Products-m-Commerce," www.724.com, Sep. 25, 2001, pp. 1-4.

"724 Solutions-Products-Wireless Internet Platform," www.724.com, Sep. 25, 2001, pp. 1-3.

"Affiliate Application," How do Gator, Price Helper and Offer Companion Work?, www.gator.com, Sep. 6, 2001, 1 page.

"Choicepoint Unveils New Web-based Pre-Employment Screening Service," Business Wire pp. 1287, May 17, 1999.

"Co-Brand Partner Opportunities," www.yodlee.com, Sep. 6, 2001, pp. 1-2.

"Content Partner Opportunities," www.yodlee.com, Sep. 6, 2001, 1 page.

"Create Relationships," www.digitalme.com, Sep. 6, 2001, pp. 1-2.

"Digitaline™ Fact Sheet (www.digitalme.com)" www.digitalme.com, Sep. 6, 2001, pp. 1-3.

"Ezlogin.Com Introduces Liveclips, Enabling Net Users to Clip Content From Anywhere on the Web and Paste It on a Custom Page," Java Industry Connection, Mar. 8, 2000, pp. 1-2.

"FAQ", www.digitalme.com, Sep. 6, 2001, pp. 1-2.

"Free Password Manager-Store passwords-Desktop or Online," www.passwordsafe.com, Oct. 10, 2001, 1 page.

"Implementing Mobile Passport," Copyright 1999-2001 Microsoft Corporation, Oct. 26, 2001, pp. 1-5.

"Learn More," www.digitalme.com, Sep. 6, 2001, pp. 1-2.

"Liberty Architecture Overview," Version 1.1, Internet Citation, Jan. 15, 2003, pp. 1-44.

"LinkUall.com-About Us-LinkUall Technology" www.linkuall.com, Copyright 1999-2000 Sinpag Inc., 1 page.

"LinkUall.com-Products-Calendars and Address books," www.linkuall.com, Oct. 10, 2001, pp. 1-2.

"Make it Convenient," www.digitalme.com, Sep. 6, 2001, pp. 1-3.

"Microsoft Passport Member Services. What is Passport," www.passport.com, Aug. 3, 2001, pp. 1-12.

"Microsoft Passport: A single name, password and Wallet for the web," www.passport.com, Aug. 3, 2001, pp. 1-2.

"Microsoft Passport: Streamlining Commerce and Communication on the Web," www.passport.com, Oct. 11, 1999, pp. 1-3.

"Online Businesses Use Microsoft Passport Single Sign-In and Wallet Services to Provide Customers with Secure and Convenient Shopping," www.microsoft.com, May 17, 2000, pp. 1-2.

(56) References Cited

OTHER PUBLICATIONS

"Security Overview," www.yodlee.com, Sep. 6, 2001, pp. 1-2.
"Spam-me-not Documentations," Web Archive Dated Oct. 11, 2003, 5 pages.
"Spamgourmet: FAQ," by Spamgourmet.com, Web Archive dated Aug. 29, 2003, 3 pages.
"Spoofed/Forged Email," 2002 Carnegie Mellon University, pp. 1-7.
"Sweet Enonymity," www.enonymous.com, Sep. 6, 2001, pp. 1-2.
"Take Control," www.digitalme.com, Sep. 6, 2001, pp. 1-2.
"Vision for an Enonymous Infomediary," www.enonymous.com, Sep. 6, 2001, pp. 1-3.
"Yodlee2Go: Web-enabled Phones", www.yodlee.com, Sep. 6, 2001, I page.
"Yodlee for Mobile: Simplify Your Life on the Road with Yodlee2Go," www.yodlee.com, Sep. 6, 2001, I page.
"Yodlee for Web: One-Click Access to All Personal Accounts," www.yodlee.com, Sep. 6, 2001, I page.
"Yodlee2Go: Palm OS Wireless," www.yodlee.com, Sep. 6, 2001, I page.
"Yodlee: e-Personalization Applications," www.yodlee.com, Sep. 6, 2001, 1 page.
"Yodlee: e-Personalization Platform," www.yodlee.com, Sep. 6, 2001, 1 page.
"Yodlee: e-Personalization Solutions," www.yodlee.com, Sep. 6, 2001, 1 page.
"Zkey-Corporate," www.zkey.com, Oct. 10, 2001, 1 page.
Advisory Action before the Filing of an Appeal Brief for U.S. Appl. No. 09/988,811, Mailed on Apr. 20, 2009, 3 pages.
Advisory Action for U.S. Appl. No. 09/933,567, Mailed on Jul. 21, 2006, 3 pages.
Advisory Action for U.S. Appl. No. 10/455,438, Mailed on Feb. 19, 2010, 3 pages.
Advisory Action for U.S. Appl. No. 11/039,885, Mailed on Feb. 24, 2010, 4 pages.
Advisory Action for U.S. Appl. No. 11/039,886, Mailed on Sep. 17, 2010, 3 pages.
Advisory Action for U.S. Appl. No. 11/327,176, Mailed on Mar. 25, 2011, 2 pages.
Advisory Action for U.S. Appl. No. 11/824,358, Mailed on Aug. 24, 2010, 3 pages.
Alan Cohen and Walaika Haskins, "Grab and-Go Web," PC Magazine, Oct. 19, 2000, pp. 1-5.
Bennett, "NGWS-Microsoft's Dot Net Strategy," PC_Buyer's_Guide.com, Jun. 22, 2000, pp. 1-5.
Coulouris, "Secure Communication in Non-Uniform Trust Environment," ECOOP Workshop on Distributed Object Security, Jul. 1998, 5 pages.
Final Office Action for U.S. Appl. No. 09/933,567, Mailed on Nov. 1, 2007, 13 pages.
Final Office Action for U.S. Appl. No. 09/933,567, Mailed on May 11, 2006, 9 pages.
Final Office Action for U.S. Appl. No. 09/988,811, Mailed on Jan. 27, 2010, 8 pages.
Final Office Action for U.S. Appl. No. 09/988,811, Mailed on Dec. 30, 2010, 10 pages.
Final Office Action for U.S. Appl. No. 09/988,811, Mailed on Feb. 2, 2009, 9 pages.
Final Office Action for U.S. Appl. No. 10/455,438, Mailed on Oct. 30, 2008, 14 pages.
Final Office Action for U.S. Appl. No. 10/455,438, Mailed on Dec. 2, 2009, 8 pages.
Final Office Action for Patent Application No. 10/455,438, Mailed on Jun. 26, 2007, 10 pages.
Final Office Action for U.S. Appl. No. 10/713,100, Mailed on Oct. 28, 2008, 9 pages.
Final Office Action for U.S. Appl. No. 10/713,100, Mailed on Oct. 30, 2009, 11 pages.
Final Office Action for U.S. Appl. No. 10/713,100, Mailed on Jun. 14, 2007, 14 pages.
Final Office Action for U.S. Appl. No. 11/039,885, Mailed on Nov. 29, 2010, 19 pages.
Final Office Action for U.S. Appl. No. 11/039,885, Mailed on Dec. 16, 2009, 14 pages.
Final Office Action for U.S. Appl. No. 11/039,885, Mailed on Mar. 18, 2009, 12 pages.
Final Office Action for U.S. Appl. No. 11/039,885, Mailed on Sep. 10, 2009, 14 pages.
Final Office Action for U.S. Appl. No. 11/039,886, Mailed on Mar. 5, 2009, 16 pages.
Final Office Action for U.S. Appl. No. 11/039,886, Mailed on Jul. 9, 2010, 20 pages.
Final Office Action for U.S. Appl. No. 11/327,160, Mailed on Feb. 23, 2007, 10 pages.
Final Office Action for U.S. Appl. No. 11/327,160, Mailed on Mar. 25, 2008, 11 pages.
Final Office Action for U.S. Appl. No. 11/327,176, Mailed on Dec. 22, 2010, 11 pages.
Final Office Action for U.S. Appl. No. 11/327,176, Mailed on Dec. 9, 2009, 11 pages.
Final Office Action for U.S. Appl. No. 11/824,358, Mailed on Jun. 29, 2010, 15 pages.
Gabber et al., "Curbing June E-Mail via Secure Classification," FC-98: Proceedings of the Second International Conference on Financial Cryptography, 1998, pp. 198-213.
Gator Press Release "Gator Helps Consumers at More Than 25,000 E-Commerce and Registration Sites in First Month of Usage: Software an invaluable companion for more than 80,000 online consumers," Aug. 3, 1999, pp. 1-2.
Gator Press Release "Gator.Com Delivers on the Promise of the Electronic Commerce Modeling Language (ECML) Standard Today: Gator offers one click shopping at over 5,000 e-commerce sites today," Jun. 14, 1999, pp. 1-2.
Gator Press Release "Internet Start-up Gator.com Introduces Gator, the Web's First Smart Online Companion: New Internet product offers one-click login and express registration and checkout across the web," Jun. 14, 1999, pp. 1-3.
Gburzynski, "A Comprehensive Approach to Eliminating Spam," Proceedings of Euromedia, Plymouth, UK, Apr. 2003, 5 pages.
Gunnerson, "EZ Login," PC Magazine, Mar. 14, 2000, pp. 1-2.
Hall, "How to Avoid Unwanted Email," Communications of the Association for Computing Machinery, vol. 41, No. 3, Mar. 1, 1998, pp. 88-95.
Hallam-Baker, "Security Assertions Markup Language: Core Assertion Architecture—Examples and Explanations," Internet Citation, http://www.oasis-open.org/committees/security/docs/draft-sstc-core-phill-07.pdf, May 14, 2001, 24 pages.
International Search Report for PCT/CA2003/000857; Applicant: Hardt, Dick, C., Filed on Jun. 6, 2003, Mailed on Dec. 22, 2003, 7 pages.
International Search Report for PCT/CA2003/01774, Applicant: Sxip Networks Srl, Filed on Nov. 17, 2003, Mailed on Jul. 13, 2004, 3 pages.
International Search Report for PCT/CA2005/000934; Applicant: Sxip Networks Srl, Filed on Jun. 16, 2005, Mailed on Sep. 28, 2005, 4 pages.
International Search Report for PCT/CA2005/000935, Applicant: Sxip Networks Srl, Filed on Jun. 16, 2005, Mailed on Oct. 4, 2005, 3 pages.
International Search Report for PCT/CA2005/000937, Applicant: Sxip Networks Srl, Filed on Jun. 16, 2005, Mailed on Oct. 6, 2005, 3 pages.
International Search Report for PCT/CA2005/000936; Applicant: Sxip Networks Srl, Filed on Jun. 16, 2005, Mailed on Sep. 20, 2005, 3 pages.
Interview Summary for U.S. Appl. No. 09/923,285, Mailed on Apr. 12, 2007, 2 pages.
Interview Summary for U.S. Appl. No. 09/933,567, Mailed on Aug. 16, 2006, 4 pages.
Interview Summary for U.S. Appl. No. 09/988,811, Mailed on Oct. 8, 2010, 3 pages.
Interview Summary for U.S. Appl. No. 09/988,811, Mailed on Mar. 15, 2010, 3 pages.

(56) References Cited

OTHER PUBLICATIONS

Interview Summary for U.S. Appl. No. 09/988,811, Mailed on Sep. 18, 2009, 2 pages.
Interview Summary for U.S. Appl. No. 10/455,438, Mailed on Apr. 14, 2010, 3 pages.
Interview Summary for U.S. Appl. No. 11/039,885, Mailed on Oct. 13, 2009, 3 pages.
Interview Summary for U.S. Appl. No. 11/039,885, Mailed on Jun. 22, 2009, 2 pages.
Interview Summary for U.S. Appl. No. 11/039,885, Mailed on Sep. 1, 2010, 3 pages.
Interview Summary for U.S. Appl. No. 11/824,358, Mailed on Aug. 6, 2010, 3 pages.
Marchiori, "Platform for Privacy Preference (P3P) Syntex Specification," Internet Citation, http://classic-web.archive.org/web/20031207022324/www.w3.org/tr/1999/wd-p3p-19990826/syntax, Aug. 26, 1999, pp. 1-25.
Menezes et al., "Handbook of Applied Cryptography," Chapter 12, Section 12.5.2, pp. 509-512, 1997.
Microsoft Press Release. "Microsoft Passport Offers Streamlined Purchasing Across Leading Web Sites," Oct. 11, 1999, pp. 1-4.
Microsoft PressPass, Microsoft.NET: "A Platform for the Next Generation Internet," Jun. 22, 2000, pp. 1-7.
Microsoft.NET Passport, Technical Overview, Sep. 2001, 29 pages.
Microsoft.NET Passport, "What's New," Sep. 2001, 14 pages.
Non Final Office Action and Interview Summary for U.S. Appl. No. 09/933,567, Mailed on Feb. 20, 2007, 16 pages.
Non Final Office Action for U.S. Appl. No. 09/923,285, Mailed on Jul. 12, 2004, 11 pages.
Non Final Office Action for U.S. Appl. No. 09/933,567, Mailed on Sep. 29, 2005, 9 pages.
Non Final Office Action for U.S. Appl. No. 09/974,766, Mailed on Feb. 4, 2005, 14 pages.
Non Final Office Action for U.S. Appl. No. 09/988,811, Mailed on Jan. 23, 2006, 12 pages.
Non Final Office Action for U.S. Appl. No. 09/988,811, Mailed on Dec. 5, 2007, 7 pages.
Non Final Office Action for U.S. Appl. No. 09/988,811, Mailed on Jul. 11, 2005, 5 pages.
Non Final Office Action for U.S. Appl. No. 09/988,811, Mailed on Jul. 14, 2009, 9 pages.
Non Final Office Action for U.S. Appl. No. 09/988,811, Mailed on Aug. 18, 2010, 8 pages.
Non Final Office Action for U.S. Appl. No. 10/455,438, Mailed on Jan. 10, 2007, 12 pages.
Non Final Office Action for U.S. Appl. No. 10/455,438, Mailed on Feb. 5, 2008, 11 pages.
Non Final Office Action for U.S. Appl. No. 10/713,100, Mailed on Feb. 27, 2009, 8 pages.
Non Final Office Action for U.S. Appl. No. 10/713,100, Mailed on Dec. 5, 2006, 15 pages.
Non Final Office Action for U.S. Appl. No. 10/713,100, Mailed on Mar. 26, 2008, 8 pages.
Non Final Office Action for U.S. Appl. No. 11/039,885, Mailed on Jun. 17, 2008, 11 pages.
Non Final Office Action for U.S. Appl. No. 11/039,885, Mailed on Jun. 3, 2010, 17 pages.
Non Final Office Action for U.S. Appl. No. 11/039,886, Mailed on Feb. 9, 2009, 20 pages.
Non Final Office Action for U.S. Appl. No. 11/039,886, Mailed on Jun. 24, 2008, 14 pages.
Non Final Office Action for U.S. Appl. No. 11/039,886, Mailed on Jun. 8, 2011, 33 pages.
Non Final Office Action for U.S. Appl. No. 11/327,160, Mailed on Oct. 4, 2007, 9 pages.
Non Final Office Action for U.S. Appl. No. 11/327,160, Mailed on Jul. 12, 2006, 12 pages.
Non Final Office Action for U.S. Appl. No. 11/327,176, Mailed on May 28, 2009, 12 pages.
Non Final Office Action for U.S. Appl. No. 11/327,176, Mailed on Jun. 9, 2010, 12 pages.
Non Final Office Action for U.S. Appl. No. 11/824,358, Mailed on Jan. 29, 2010, 13 pages.
Non Final Office Action for U.S. Appl. No. 11/824,358, Mailed on Oct. 8, 2010, 12 pages.
Non Final Office Action for U.S. Appl. No. 11/824,358, Mailed on Mar. 18, 2011, 8 pages.
Non Final Office Action U.S. Appl. No. 10/007,785, Mailed on Mar. 2, 2005, 26 pages.
Notice of Allowance and Interview Summary for U.S. Appl. No. 09/974,766, Mailed on Nov. 22, 2005, 10 pages.
Notice of Allowance and Interview Summary for U.S. Appl. No. 10/713,100, Mailed on Apr. 16, 2010, 12 pages.
Notice of Allowance for U.S. Appl. No. 09/923,285, Mailed on Apr. 12, 2007, 13 pages.
Notice of Allowance for U.S. Appl. No. 09/933,567, Mailed on Aug. 11, 2008, 9 pages.
Notice of Allowance for U.S. Appl. No. 10/007,785, Mailed on Nov. 22, 2005, 10 pages.
Notice of Allowance for U.S. Appl. No. 10/007,785, Mailed on Feb. 10, 2006, 3 pages.
Notice of Allowance for U.S. Appl. No. 10/455,438, Mailed on Apr. 30, 2010, 10 pages.
Notice of Allowance for U.S. Appl. No. 11/327,160, Mailed on Sep. 10, 2008, 12 pages.
Office Action for U.S. Appl. No. 09/988,811, Mailed on Aug. 11, 2006, 4 pages.
Non Final Office Action for U.S. Appl. No. 10/455,438, Mailed on Mar. 25, 2009, 11 pages.
Rauschenberger, Secure Your Web Site With Passport, "Simplify Your Web Site Visitors' Experience by Authenticating Them," Visual Studio Magazine, Apr. 4, 2002, pp. 1-3.
Restriction Requirement for U.S. Appl. No. 09/933,567, Mailed on Jun. 17, 2005, 5 pages.
Restriction Requirement for U.S. Appl. No. 09/988,811, Mailed on Mar. 7, 2007, 4 pages.
Restriction Requirement for U.S. Appl. No. 11/039,886, Mailed on Sep. 14, 2009, 4 pages.
Restriction Requirement for U.S. Appl. No. 11/327,176, Mailed on Feb. 17, 2009, 6 pages.
Restriction Requirement for U.S. Appl. No. 11/327,176, Mailed on Mar. 20, 2008, 6 pages.
Restriction Requirement for U.S. Appl. No. 11/327,176, Mailed on Jul. 9, 2008, 7 pages.
Secure Your Web Site With Passport, "Implement Passport," Visual Studio Magazine, Apr. 4, 2002, pp. 1-3.
Secure Your Web Site With Passport, "Passport Key to HailStrom's Success," Visual Studio Magazine, Apr. 4, 2002, pp. 1-2.
Secure Your Web Site With Passport, "Sign In, Please," Visual Studio Magazine, Apr. 4, 2002, pp. 1-3.
Supplemental Advisory Action for U.S. Appl. No. 11/039,885, Mailed on Apr. 1, 2010, 3 pages.
Supplementary European Search Report for PCT/CA2005/000934, Applicant: Sxip Networks Srl, Filed on Jun. 16, 2005, Mailed on May 27, 2011, 3 pages.
Supplementary European Search Report for PCT/CA2005/000935, Applicant: Sxip Networks Srl, Filed on Jun. 16, 2005; Mailed on Apr. 4, 2011, 3 pages.
Supplementary European Search Report for PCT/CA2005/000936, Applicant: Sxip Networks Srl, Filed on Jun. 16, 2005, Mailed on Jul. 19, 2010, 3 pages.
Non-Final Office Action for U.S. Appl. No. 11/039,885; Mailed on Aug. 26, 2011; 36 pages.
United States Patent and Trademark Office, Notice of Allowance, U.S. Appl. No. 11/039,885, mailed Apr. 29, 2013, 15 pages.
United States Patent and Trademark Office, Notice of Allowance, U.S. Appl. No. 09/988,811, mailed May 24, 2013, 19 pages.
Tenebaum et al. "Commercenet Consortium," AFRL-ML-WP-TR-1999-4147. Air Force Materiel Command, Wright-Patterson AFB, Jul. 1999, 79 pages.
United States Patent and Trademark Office, Advisory Action, U.S. Appl. No. 12/434,803, mailed Nov. 29, 2013, 3 pages.

(56) References Cited

OTHER PUBLICATIONS

United States Patent and Trademark Office, Non-Final Office Action, U.S. Appl. No. 12/434,803, mailed Mar. 18, 2014, 17 pages.
United States Patent and Trademark Office, Non-Final Office Action, U.S. Appl. No. 11/327,176, mailed Mar. 21, 2014, 16 pages.
United States Patent and Trademark Office, Notice of Allowance, U.S. Appl. No. 11/039,886, mailed Apr. 5, 2013, 8 pages.
United States Patent and Trademark Office, Final Office Action, U.S. Appl. No. 11/039,885, mailed Aug. 15, 2012, 50 pages.
United States Patent and Trademark Office, Non-Final Office Action, U.S. Appl. No. 11/039,886, mailed Aug. 21, 2012, 33 pages.
United States Patent and Trademark Office, Supplemental Notice of Allowability, U.S. Appl. No. 11/824,358, mailed Jun. 18, 2012, 6 pages.
United States Patent and Trademark Office, Final Office Action, U.S. Appl. No. 12/434,803, mailed Aug. 14, 2012, 11 pages.
United States Patent and Trademark Office, Final Office Action, U.S. Appl. No. 12/434,803, mailed Aug. 28, 2013, 12 pages.
Papadimitratos, P. et al. "Secure Routing for Mobile Ad hoc Networks," In Proceedings of the SCS Communication Networks and Distributed Systems Modeling and Simulation Conference, San Antonio, Texas, Jan. 2002, pp. 1-13.
United States Patent and Trademark Office, Non-Final Office Action, U.S. Appl. No. 14/015,813, mailed Apr. 21, 2014, 15 pages.
United States Patent and Trademark Office, Advisory Action, U.S. Appl. No. 12/434,803, mailed Oct. 23, 2012, 3 pages.
United States Patent and Trademark Office, Non-Final Office Action, U.S. Appl. No. 12/434,803, mailed Dec. 7, 2012, 15 pages.
United States Patent and Trademark Office, Non-Final Office Action, U.S. Appl. No. 11/039,885, mailed Nov. 9, 2012, 17 pages.
United States Patent and Trademark Office, Final Office Action, U.S. Appl. No. 11/039,886, mailed Jan. 14, 2013, 31 pages.
United States Patent and Trademark Office, Non-Final Office Action, U.S. Appl. No. 12/434,803, mailed Mar. 1, 2012, 12 pages.
European Patent Office, Examination Report, European Patent Application 05757655.5, mailed Apr. 13, 2012, 6 pages.
United States Patent and Trademark Office, Notice of Allowance, U.S. Appl. No. 11/824,358, mailed May 1, 2012, 9 pages.
United States Patent and Trademark Office, Final Office Action, U.S. Appl. No. 09/988,811, mailed May 14, 2012, 16 pages.
United States Patent and Trademark Office, Notice of Allowance, U.S. Appl. No. 14/015,813, mailed Sep. 26, 2014, 8 pages.
United States Patent and Trademark Office, Final Office Action, U.S. Appl. No. 11/327,176, mailed Oct. 27, 2014, 15 pages.
United States Patent and Trademark Office, Non-Final Office Action, U.S. Appl. No. 12/434,803, mailed Aug. 14, 2015, 13 pages.

\* cited by examiner

AUDITABLE PRIVACY POLICIES IN A DISTRIBUTED HIERARCHICAL IDENTITY MANAGEMENT SYSTEM

FIELD OF THE INVENTION

The present invention relates generally to electronic identity management systems. More particularly, the present invention relates to authentication and security for data exchange in a distributed hierarchical identity management system pertaining to auditable privacy policies.

BACKGROUND OF THE INVENTION

Many identity management systems are known in the art including Microsoft's Passport™, the Liberty Alliance, and the identity management system described in detail in Canadian Patent No. 2,431,311 and its corresponding applications including U.S. Patent Application Publication No. US 2003/0229783A1, each owned by Sxip Networks.

Identity management is of great concern in the electronic commerce field because it allows an electronic vendor or service provider to provide a user with customized services and further allows the vendor to track user behavior. From the user perspective, identity management permits a user to retrieve previously stored identifying information. In the absence of any identity management system each individual use of a service would be accompanied by selecting a series of settings that could not be maintained in the following session. For example, in the case of an on-line purchase the lack of an identity management system would entail requiring a user to provide all identifying information, including credit card numbers, billing and shipping addresses for each and every purchase. This is commonly regarded as a nuisance to consumers, and serves as a detriment to on-line commerce.

One skilled in the art will appreciate that though the following discussion generally relates to electronic commerce applications of identity management, a number of other non commerce related services, such as customisation of a news site, registration for access to a newspaper, and maintenance of a desired display configuration for an electronic discussion site, all make use of identity management. For these services the ability of a user to have a single-sign on for multiple services is a high priority.

To ensure that a user can use a single user ID for a plurality of services, and to provide what is commonly referred to in the art as "single sign-on", a second generation identity management and authentication solution was created. This solution is typically referred to as a hierarchical identity management system, and is typified by Microsoft's Passport™ service.

In contrast to the hierarchical nature of the Passport™ service, Liberty Alliance systems are referred to as distributed. These distributed systems have a plurality of identity storage providers, and vendor sites communicate to the identity storage provider of their user through a complex secured communication back channel that employs a number of different cryptographic techniques requiring the maintenance of complex and large key rings.

However, according to the specification of the Liberty Alliance, only a defined set of user identity information is stored at the identity storage providers. Thus, E-tailers must still question users about information not stored by an identity storage provider. Additionally, public and private encryption keys require each identity storage provider to be able to perform numerous computation intensive tasks for each data request. Additionally, a sophisticated key management system must be employed as the size of the web of trust increases. One skilled in the art will readily appreciate that the number of identity storage providers in a web of trust cannot scale infinitely. Though it is possible to implement a system whereby each identity storage provider can trust every other identity storage provider when there is a small number of identity storage providers, it is unlikely that such a system can be implemented in a reliable fashion when the number of identity storage providers scales into the tens of thousands.

From the perspective of user, the model presented by the Liberty Alliance has a number of drawbacks. A user's single sign-on abilities are somewhat restricted. A user is assigned a unique user ID that identifies them to their selected identity storage provider.

Both Passport™ and the Liberty Alliance provide E-tailers and other sites requiring user authentication with pair-wise unique identifiers (PUIDs). PUIDs allow the e-tailer to store information and build a profile on a user, while preventing two e-tailers from easily correlating their databases to determine user activities and patterns. PUIDs in the liberty alliance are assigned by the identity storage provider holding the user profile, and cannot be matched to the user account by any other identity storage provider, thus if a user chooses to change identity storage providers all the site specific settings at each E-tailer are lost. This handcuffs users to an identity storage provider providing no more opportunity for portability for most users than the single source Passport™ does. Furthermore, the purpose of the PUID assigned by either Passport™ or the Liberty Alliance can be overcome by correlating other information such as credit card information.

As described above, conventional identity management systems employ back channels between the identity data providers and other sites in the networks. These back channels are provided as a one size fits all solution. Thus, in order to provide security for sensitive information, the back channel is encrypted. If the identity management system is distributed, the channels make use of complex and unwieldy key rings to ensure security. However, if the only data that the user is submitting is non-sensitive, such as e-mail or postal address information, the data does not require a secure channel. Many sites requesting this information do not operate on secure servers and moving to such a system would be considered onerous. It would be desirable to offer a mechanism to allow a user to interact with the data store in a secure fashion to ensure protection of authentication information, but to then submit information to other websites over insecure channels, through preferably only after user approval.

In addition to requiring a secure server, conventional identity management systems requiring the scripts or code operating at a vendor website to be modified to interact with the defined channels and data passing techniques specified by the network. Though this may not be a problem for new, well funded entities, changing a large established code base is a daunting task if the site is already live and functioning. Thus, it would be beneficial to provide a system to allow an online merchant to very slightly modify an existing site to join an identity management network.

Conventional identity management networks provide no mechanisms to easily incorporate a website's existing user base. Conventional identity management systems require users to lose their history at a website to use the identity management network in conjunction with the website at which an existing account is established. This is a detriment to a website operator interested in tracking the historical behaviour of users. It would be advantageous to offer a mechanism to allow user history and preferences to be maintained for existing users of a website as they join the identity management network.

In conventional hierarchical identity management systems, all user data is centrally stored, thus creating a central location from which data can be obtained if the system is compromised. Furthermore, users must have a level of trust with the central party so that they trust that the stored data will not be leaked or otherwise revealed. In a distributed system, there is a plurality of user data stores. If a single store is compromised only the data about its users is revealed.

In both cases the user data can be encrypted prior to storage to allow for added security in the event that the data store is compromised. However, the user must still have a trust relationship with the data store operator to know that the data will not be decrypted inappropriately. Further, the user must trust the data store operator is capable of securely storing the decryption key so that it is not made available inadvertently.

Furthermore, in a distributed identity management system the ability to increase the number of identity service providers is important, so that users have a variety of parties to choose from, preferably some of those entities have a pre-existing trust relationship with the user. However, as with all complex systems and networks, it is difficult and time consuming to create a secured server to store user data and conform to the requirements of the identity management network. Thus, it would be desirable to provide an identity management server that requires a minimal amount of user customization, and allows the secure storage of user information so that the data cannot be inadvertently, or otherwise, released by the identity management system without user approval.

As identity management systems begin use in a variety of fields and niche markets, new security and authentication mechanisms, along with other such advances, become necessary to account for previously unforeseen needs. It is, therefore, desirable to provide an identity management system with novel authentication and security mechanisms.

SUMMARY OF THE INVENTION

It is an object of the present invention to obviate or mitigate at least one disadvantage of previous privacy policy management systems.

In a first aspect of the present invention, there is provided a method of obtaining authenticated approval of a policy from a user. The method comprises the steps of transmitting a request for acceptance of the policy; receiving a digitally signed acceptance in response to the transmission of the request; and determining that the acceptance is digitally signed by an entity authoritative to sign on behalf of the user.

In an embodiment of the present invention, the policy is a privacy policy, and is preferably a privacy preference project compliant privacy policy. In another embodiment, the step of transmitting a request includes transmitting the policy and a request for user data associated with the policy, preferably to the user. In a further embodiment, the step of receiving includes receiving the digitally signed acceptance from the user, preferably the digitally signed acceptance is digitally signed datablock including a copy of the policy and user data associated with the policy, where the digitally signed acceptance is digitally signed by a third party. In a further embodiment, the step of determining includes determining that the third party is delegated responsibility to sign on behalf of the user by a trusted authority, which is determined by verifying a chain of delegations from the trusted authority to the third party. In another embodiment, the method further includes the step of storing the signed acceptance.

In a second aspect of the present invention, there is provided a method of providing authenticated approval of a policy from a user. The method comprises the steps of receiving a request to approve the policy; obtaining user approval of the policy; signing the policy on behalf of the user; and transmitting the signed policy.

In an embodiment of the second aspect of the present invention, the method further includes the steps of authenticating the user and displaying the policy to the user prior to obtaining the user approval. In another embodiment, the policy includes a block of text and the step of displaying the policy includes displaying the block of text to the user. In another embodiment the policy is a machine readable policy, and the step of displaying the policy includes comparing the policy to a set of user defined preferences, and displaying the result of the comparison to the user. In other embodiments the policy is a privacy policy, and is preferably a platform for privacy preference project compliant privacy policy. In other embodiments, the step of receiving includes receiving the request from a third party via the user, while the step of signing includes signing a datablock including the policy and user data associated with the policy. In a further embodiment, the request is made by a third party and the step of transmitting includes transmitting a chain of signed delegations from an authority trusted by the third party, the chain of signed delegations indicating authority to sign on behalf of the user.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for identity management. Though described herein in relation to a distributed hierarchical identity management system, one skilled in the art will appreciate that it is not always necessary that the identity management system be both distributed and hierarchical.

Figure 1:
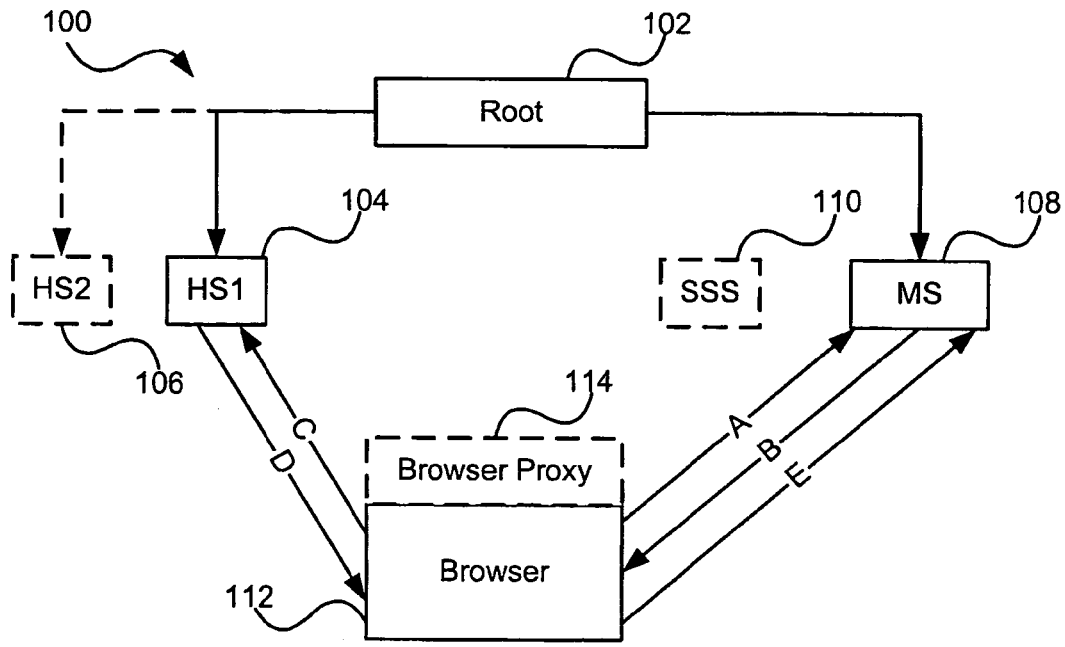
FIG. 1 is a block diagram illustrating dataflow in an embodiment of the identity management system of the present invention.

FIG. 1 illustrates a general overview of an identity management system 100 of the present invention. In a distributed hierarchical identity management system, such as the one illustrated in FIG. 1, users are assigned a global unique identifier (GUID), which is also referred to as a globally unique persona identifier (GUPI). The identity management system 100 is administered by root 102, which ensures that a homesite, such as HS1 104 and HS2 106, is authoritative for any given globally unique persona identifier (GUPI) associated with a user. A membersite, such as MS 108, provides the user a service, and requires identifying information about the user that will be obtained from HS1 104. Simple site server (SSS) 110 is not used in this particular scenario, nor is HS2 106, but will be described in more detail below. A user employs browser 112 and optionally browser proxy 114.

Browser 112 initiates a session with MS 108, and is then asked for identifying information, or a login. The user indicates, via datapath A, that the required information can be provided by HS1 104. MS 108 generates a request for the information stored by HS1 104, and forwards it, preferably as an https form, to the user, via datapath B. The https form preferably has a nonce associated with it, to act as a session identifier, and includes a redirect to HS1 104, via datapath C. If the user is not already logged in and authenticated, HS1 104 obtains login information to authenticate the user. The login information can be obtained in a number of ways, including through obtaining a username and password pair, receiving a secure token, or through an out-of-band communication as discussed below. The user authentication process is not required to use http, or other standard protocols, though in a presently preferred embodiment the authentication does use a username and password combination provided over an https channel. HS1 104 then preferably seeks user authorization to release the requested information to MS 108. The requested information could be as simple as the GUPI provided as a URL encoded name-value pair, or as rich as an XML fragment. Upon receiving the user authorization to release the requested information to MS 108, HS1 104 sends an https form to the user along datapath D. The form sent on datapath D contains a redirect to MS 108 and causes an https post, over datapath E, to deliver the requested information to MS 108 along with the nonce so that MS can properly identify the received information. One skilled in the art will appreciate how to generate the redirects, which when automated provide the user with a seamless experience.

Conventionally a get can be redirected, but a post cannot be. Posts allow a homesite to provide a membersite with user information in response to the initially transmitted form. If a user has indicated that they would like a seamless login from clicking a membersite login link, so that they are simply redirected to the homesite, and then bounced back to the membersite without having to acknowledge the homesite, the homesite must redirect a post to the membersite. Conventionally, the redirection of a post results in a user alert, impairing the user's seamless experience. To accomplish a redirected post, HS1 104 sends browser 112 a form page with login or user data preferably stored as a hidden field. The use of the hidden field prevents a page from being loaded on browser 112 containing data that may confuse the user, and will detract from the appearance of a seamless login. The use of the hidden field is optional. This page preferably contains a link to MS 108 that when followed will post the hidden data to MS 108. Conventionally, the user would be asked to click on the link to post the data to MS 108. Through the use of a Javascript™ command, or other such scripting language command, on the webpage, the link can be followed automatically, without showing the user what is happening. If the user has Javascript™ disabled, the browser 112 simply displays a link indicating that the user should click the link to continue. With the redirected post, any node in the identity management network 100 can redirect a user to another node using a post to push information along with the user. In the following description, any post described can be replaced with the above described redirected post.

One skilled in the art will appreciate that user information can be provided in an XML block or fragment. To protect the user's privacy, and security, the GUPI, nonce and timestamp are often signed by the HS to allow for authentication of the information, and passed through an encrypted channel such as a secure sockets layer (SSL) or hyper-text transfer protocol secure sockets (https) channel. However, at this point MS 108 has a statement from an entity it may have never encountered before, HS1 104, that a user has certain attributes, including a particular GUPI. MS 108 needs a mechanism to verify that the information is correct, or at least can be trusted to a certain degree. It may be possible to determine that HS1 104 is part of the network 100, and then create a back channel to HS1 104 to obtain the certificate, herein after interchangeably referred to as a cert, to determine if the data has been properly signed. One skilled in the art will appreciate that for a variety of reasons, including certificate expiration, HS1 104 will occasionally change the certificate or key with which the signature is performed. These changes in certificate make administration of a key ring very complex. The establishment of a back channel requires that MS 108 and HS1 104 operate in a trusted environment, and that the back channel initiation cannot be accomplished by another party. These conditions are not always possible to maintain. By participating in the identity management network 100, MS 108 is expressing trust in root 102. Root 102 participates in registering a user with given homesites, such as HS1 104, and can provide an assertion to HS1 104 that it is authoritative to authenticate a user as being associated with a GUPI. This assertion preferably takes the form of an XML fragment containing the GUPI and a homesite identifier, such as a homesite identification tag or the homesite cert id, also referred to as the homesite key id. This XML fragment is then signed by root 102 and provided to HS1 104. When HS1 104 provides a response to MS 108 through browser 112, it can sign the response, and include the root signed assertion. MS 108, can verify the root signed assertion, and see that HS1 is in fact authoritative for the provided GUPI, and can also verify the certificate used by HS1 104 to sign the response. The response can then be verified as being signed by HS1 104. Thus, MS can verify the data as being asserted by HS1 104, and can further verify that root 102 has delegated authority to HS1 104 to make assertions for the provided GUPI. Thus, based on a trust relationship with the centralized root 102, MS 108 can interact with HS1 104 without having a pre-existing trust relationship. Further assertions and delegations of authority can be performed and will be discussed in more detail below.

As discussed above, when a user signs up at a homesite (HS), the HS receives a root-signed datablock containing the GUPI and the HS identifier. The HS receives one such datablock for each GUPI it is authoritative for. Upon receiving a user, a MS can guess the HS associated with the user by examining a cookie provided by the HS. If an HS sets a cookie for a user that it is not authoritative for, the user can determine that they have been routed to the wrong HS, either before or after being redirected for validation. In the event that the user does not notice that they are at the wrong HS, a HS that is not authoritative for a GUPI cannot provide the datablock signed by the root showing that the HS is authoritative for the GUPI.

When MS 108 attempts to obtain authentication of the user, typically through redirection of browser 112, MS 108 provides HS1 104 a nonce, such as a session ID or other such tracking information which is considered to be probabilistically unique. When HS1 104 provides authentication of the user, typically by providing MS 108 with both proof of being authoritative for the user's GUPI and the requested log-in information, the nonce is typically returned with a timestamp, so that MS 108 knows when the authentication was performed and can match the response to a request. The authentication and user information can be provided through a number of channels including through a back channel between MS 108 and HS1 104, though in a presently preferred embodiment the user provides this information to MS on behalf of HS1 104 through a redirection. To ensure that HS1 104 authentication information has not been altered in transit, HS1 104 typically signs the data block. To verify the signature and show that it is authoritative HS1 104 transmits a datablock, including the GUPI and a HS identifier, which is signed by root 102. The HS identifier is used to authenticate the datablock containing the user authentication information by allowing MS 108 to verify HS1 104's key was used to sign the data. It is foreseen that an HS cert may not be signed directly by the root 102, but instead may be signed by another authority, that is itself signed by root 102 (either directly, or through a series of other stages). This delegation of authority will be explained in more detail below. In a presently preferred embodiment of the invention, HS1 104 provides the entire cert chain from HS1 104 to root 102, including all intervening authorities. This cert chain allows MS 108 to validate that the user information has not been tampered with, and that HS1 104 is authoritative for the GUPI, without requiring a complex key ring, or a series of back channel communications to a number of intervening authorities.

Figure 2:
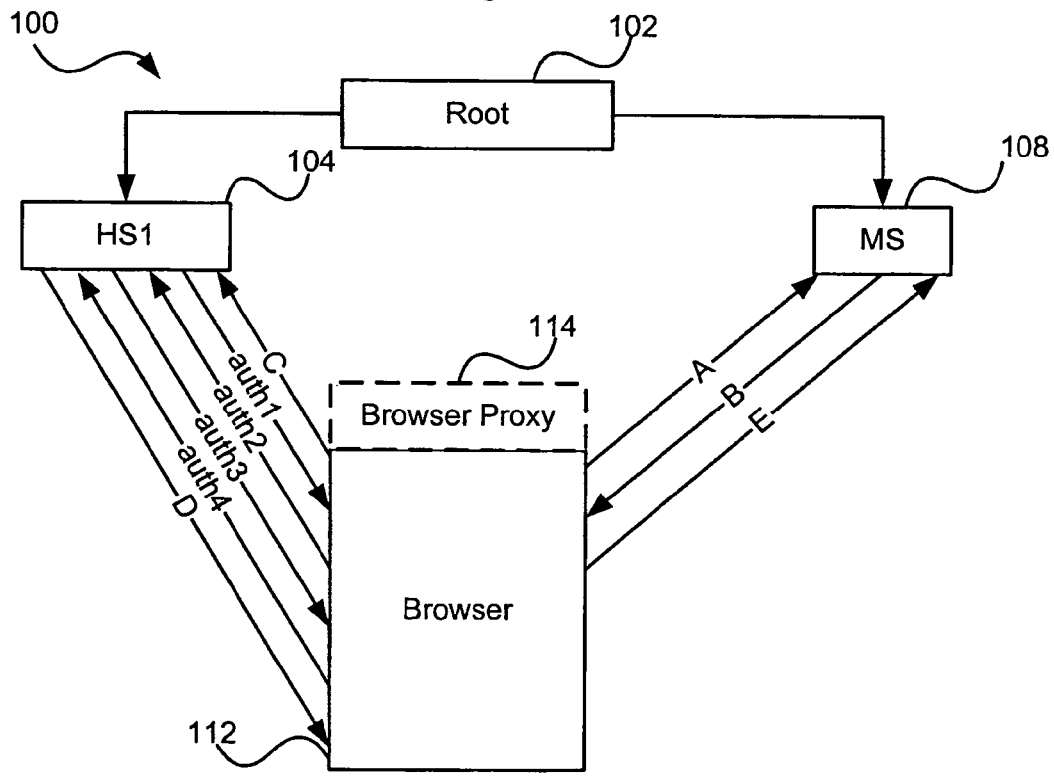
FIG. 2 is a block diagram illustrating the datapaths used to enable a secure connection between the browser and the homesite for an insecure connection to a membersite.

In FIG. 1, MS 108 provided the data request over an https channel. This provides a degree of security and prevents the user information from being transmitted in the clear. However, there are a number of situations in which either MS 108 is not sophisticated enough to use a secure channel, or the data that is being requested is not sensitive enough to require the secure channel. One such example of this is that MS 108 simply wants a postal code and city of residence from a user. As this information is not being transmitted with other identifying information, there is no need to use a secure channel. However, to obtain the information from HS1 104, browser 112 must be authenticated. The authentication information typically includes a username and password combination, or other such identifying information that should only be sent by a secure channel. Because the request from MS 108 used standard http, the response to the request must be in standard http, though the user authentication with HS1 104 should be done over https. If the http form results in an https post, the user will typically be presented with a warning message. This is considered to be inconvenient to the user, and results in the user not being presented with a seamless experience after clicking on a login button. To overcome this, the network 100 of the present invention provides a mechanism to allow for HS1 104 to securely authenticate a user and provide the user information over an insecure channel, as is illustrated in FIG. 2. In datapath A, browser 112 indicates that the user information is available through HS1 104, as before. Datapath B is used by MS 108 to send an http form to browser 112 to be forwarded to HS1 104. The http form causes browser 112 to send an http post to HS1 104 over datapath C. HS1 104 now needs to create a secure connection to browser 112 over which the user authentication can be performed. To accomplish this, HS1 104 transmits an http response, over datapath auth1, to browser 112. Contained in the http response transmitted over datapath auth1, is a refresh instruction causing browser 112 to refresh with an https get which is transmitted over datapath auth2. This can be transmitted as a blank page with hidden data and a standard HTML refresh command. This allows HS1 104 to create a secure connection, preferably using https, over which browser 112 can be authenticated for a GUPI. When the user has been authenticated, and has agreed to the release of the requested information, HS1 104 must now send the requested data to MS 108, via browser 112, using http instead of the https connection presently in use. To accomplish this, HS1 104 transmits an https response to the browser over datapath auth3. This https response forces a refresh with an http get transmitted over datapath auth4. In response to the http get, HS1 104 transmits the information requested by MS 108 to the browser 112 over datapath D using http. Upon receiving the requested information, browser 112 is redirected to MS 108 and provides the requested data using an http post over channel E. Thus, MS 108 is able to request information over http and receive the response over http, while browser 112 and HS1 104 communicate to each other using https for the authentication operations. The user of the secure channels provides both security, and gives the user some proof that HS1 104 is the homesite that it claims to be.

Figure 3:
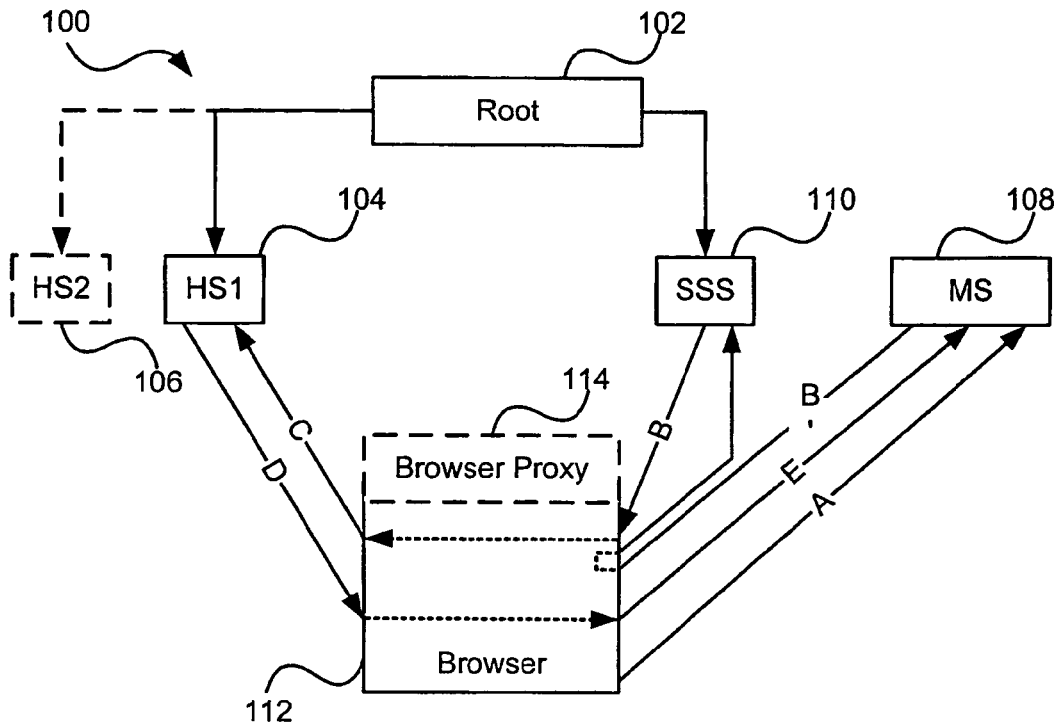
FIG. 3 is a block diagram illustrating the dataflow and network configuration for using a simple site server.

To provide a mechanism to easily integrate an existing site into the identity management network 100 as a membersite 108, simple site server (SSS) 110 can be provided. This additional server allows a vendor with an existing server to accept simple name value pairs to be provided from HS1 104, without verification. This allows the simple name value pairs to be provided by HS1 104 to MS 108, through browser 112, and have the data to be posted directly into the existing scripts at MS 108. FIG. 3 illustrates the architecture and sample data flows of the present invention.

Browser 112 is launched and loads a page at MS 108, as demonstrated by dataflow A. MS 108 is an existing server designed to receive information using a standard HTML form. The page generated by MS 108 has been modified to include a link to allow a user of identity management network 100 to use HS1 104 to provide the information requested by MS 108. Whereas MS 108 would normally guess the homesite based on a cookie carried by browser 112, the link forwards browser 112 to SSS 110, as shown in dataflow B'. In one presently preferred embodiment, SSS 110 is customized around MS 108 and the data that it requests from the user, in an alternate embodiment, MS 108 instructs SSS 110 that the data should be provided as a set of name value pairs, and provides the name-value pairings. SSS 110 guesses the user's homesite, much as MS 108 did in FIG. 1, and provides the data request to browser 112 over datapath B. Browser 112 is then redirected to HS1 104 over datapath C. This data request also includes a return address, so that HS1 104 can forward the data directly to MS 108, and not SSS 110. Browser 112 connects to HS1 104 and provides the name request from MS 108 over datapath C. HS1 104 authenticates the user and obtains authorization to release the requested information. Upon receipt of the authorization, HS1 104 provides the requested data, formatted as the name value pairs defined in the request from MS 108, to the browser 112 over data path D. Browser 112 is then redirected to MS 108 over datapath E. The data sent through browser 112 by HS1 104 is provided to MS 108, and is posted directly into the form processing scripts. Thus, MS 108 is able to request information from HS1 104 without requiring a rewrite of the scripts, through the simple addition of a networked computing appliance, that can be provided as a discrete hardware component custom designed and optimized for its task.

One skilled in the art will appreciate that SSS 110 functions as a proxy to MS 108 for communication to the identity management network 100, and in particular to HS1 104. The link that a user clicks upon to indicate membership in the identity management network posts a request that would normally have been directed to HS1 104. Instead this post is made to SSS 110, which acts as a proxy and guesses the homesite, redirects the user to the guessed homesite. From this point in the process, the same dataflows used in the previously described methods are followed.

Figure 4:
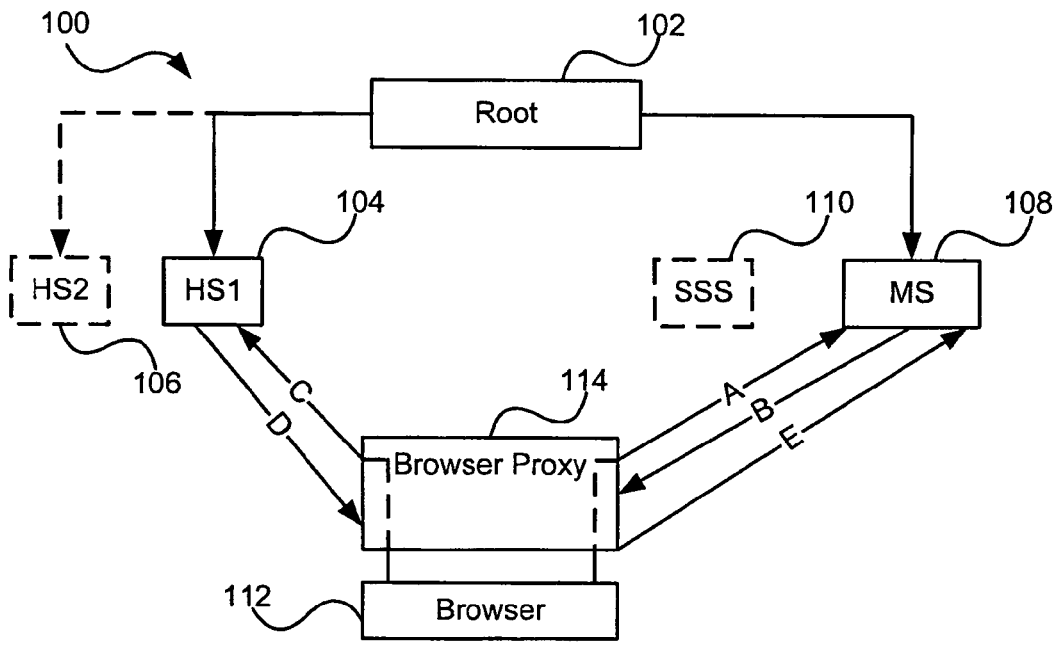
FIG. 4 is a block diagram illustrating the dataflow and network configuration for using a browser proxy.

For numerous thin clients, such as smart phones and personal digital assistants with data access, bandwidth and connection speed are a-limited. If assertions are signed and transmitted from the homesite to the thin client browser, there can be noticeable slowdown related to the transfer of these assertions. Additionally, these clients typically have data connections that are metered, resulting in additional cost to transfer the assertions from the homesite to the browser and then back to the membersite. To provide a mechanism to facilitate reducing the data transmitting in this fashion, an embodiment of the identity management network 100 of the present invention takes advantage of a trust relationship between the user and a proxy service, typically offered by the cellular carrier providing the data service. A network model of this embodiment of the present invention is illustrated in FIG. 4. All interaction between browser 112 and the rest of the network 100 is routed through browser proxy 114. When the browser 112 initiates a session with MS 108, Browser 112 instructs browser proxy 114 over datapath A' to create a session with MS 108 over data path A. Browser Proxy then receives and receives the redirection command over datapath B. Browser 112 and browser proxy 114 are redirected to HS1 104 data path C, where the user authenticates using datapath C' to provide browser proxy 114 with the authentication information and to approve the release of the requested information. Upon authentication, HS1 104 sends the data to browser proxy 114 over datapath D. This information is redirected to MS 108, over datapath E, bypassing browser 112. This allows browser proxy 114, which has a faster network connection than browser 112, to minimize the data sent over the slow connection to browser 112. Because browser 112 has an existing trust relationship with the cellular carrier, or other such entity, operating browser proxy 114, browser 112 is able to delegate activities to browser proxy 114 to increase the effective speed of the system. It is recognized that due to the trusted relationship between the user and the cellular carrier, the browser proxy 114 and HS1 104 may be operated by the same entity, and may even be integrated for ease of network planning. It is also recognized that this proxy setup need not be limited to thin clients, but may be employed by other devices, such as standard personal computers with dial-up or metered access who wish to reduce the amount of data transferred to and from their computer.

HS1 104 is determined to be authoritative for the authentication of a GUPI if it can provide a root signed block of data including a homesite identifier, and the GUPI. By signing this datablock, root 102 is delegating authentication responsibility for the GUPI to HS1 104. The idea of such a delegation of authority, and the accompanying assertion, can be combined with a chain of certificates to provide a wide variety of features.

A user is assigned a GUPI when registered into the identity management network 100. This GUPI is, by definition, unique. The HS that registers the user is made authoritative for authenticating the user associated with the GUPI. The HS then stores a profile for the user. Parts of the profile may include information about membership in loyalty or affiliate programs, and the status of the membership. For example, a loyalty program may provide a signed assertion to HS1 104 that the user associated with a particular GUPI has a particular membership number, and has reached a particular level in the loyalty program. This assertion can be broken into two elements, the first element being the user's membership number the second being the membership level. The first element is permanent, while the second element is time sensitive. Thus, the loyalty program, the authoritative site AS 140, can provide the user with two signed assertions. The first assertion is the membership number, while the second is the membership level. The second assertion can be provided with an expiry date. When MS 108 requests the user information, including any information pertaining to the loyalty program, HS1 104 will assemble the subset of the user's profile to be sent, and in the process will preferably check to see if the assertions are still valid. If an assertion by a third party is out of date, HS1 104 can contact the AS 140 and obtain a new assertion. This updating of a stale assertion can be completely performed in a back channel without user involvement, or can be performed by re-routing the user to the loyalty program to obtain the information and bring it back to the homesite.

Figure 5:
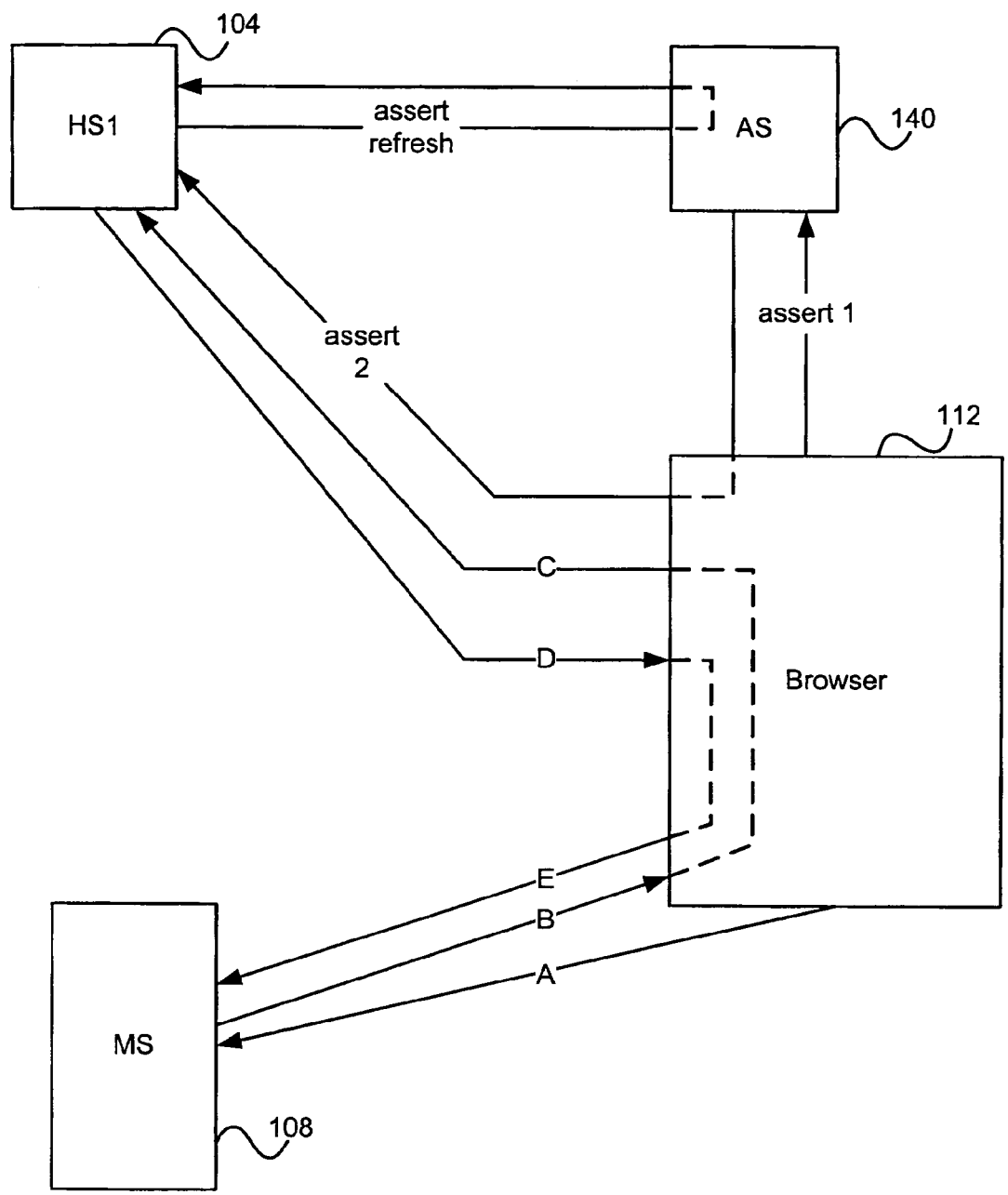
FIG. 5 is a block diagram illustrating the dataflow accompanying the use of third party assertions.

FIG. 5 illustrates how, in one embodiment, assertions are obtained and provided. Browser 112 initiates a session with an authoritative site 140 and provides identifying information in datapath assert 1. This information can include a shared secret, or may be provided by physical presence at AS 140 and use of a specified browser 112. AS 140 obtains at least one GUPI associated with the user of browser 112 (which can be obtained from HS1 104 by authenticating), and creates assertions containing asserted statements which can be strings or XML fragments, and the GUPI to which the assertion is made. These assertions are signed and sent, via browser 112, to HS1 104 along datapath assert 2. Browser 112 later initiates a session with MS 108 along data path A. MS 108 requires the previously obtained assertion, and likely wants user login information as well. As a result, MS 108 sends a login request to browser 112 along datapath B, which redirects browser 112 to HS1 104. Authentication of the user at HS1 104 is performed along datapath C, and permission to release the assertions is obtained. HS1 104 preferably examines the requested assertions to determine if they have expired. Preferably each assertion that expires includes a refresh element that dictates how an updated or refreshed assertion can be obtained. In one embodiment, the updated assertion is obtained by surrendering the stale assertion via a back channel specified in the refresh URI. The refreshed assertion is obtained by HS1 104 from AS 140 along datapath assert refresh. The assertions and user information, are sent to browser 112 along datapath D, and are then redirected to MS 108 along datapath E.

Third party assertions can be signed by the asserting party AS 140, but a chain of trust must exist between the third party and MS 108 for MS 108 to understand, or trust, the assertion. If a series of assertions are provided by a university (AS 140) indicating that a user associated with a GUPI has a particular student number, is enrolled in an engineering program, and is a student in good standing, each of these assertions would be signed by the university. However, there are a large number of universities, and requiring MS 108 to store all the keys for each university would result in a very large key ring to maintain. To overcome this problem, a university (AS 110) can prove that it is a bona fide post secondary educational institution by providing an assertion from an accreditation body that it is a recognized institution. The university's assertions about a user would be stored in the profile of a GUPI at HS1 104, and would include the accreditation body assertion that AS 140 is delegated responsibility to make assertions. Thus, MS 108 can simply recognize the accreditation body, and determine from the accreditation body's signed assertion that the university is accredited. The accreditation body's signed assertion would include the university's public certificate, or public certificate id, so that the signed assertions by the university can be recognized. This multi-tiered system of assertions allows MS 108 to reduce the key management issues, and still support a large number of third party assertions.

Following the university example outlined above, the assertion that the user of browser 112 has a particular student number would not expire, the assertion that the user is enrolled in an engineering program would expire at the end of an academic session, and the assertion that the user is a student in good standing could expire daily. When a user visits the university library website (MS 108), and uses the identity management network to log in, the three above described assertions are requested, so that the library (MS 108) can confirm that the user of browser 112 has access to the general collection (based on student number), specific collections related to the engineering faculty, and is allowed access because the student is in good standing. However, when requested for the assertions, HS1 104 checks their expiry dates. The daily expiry of the in good standing assertion requires that the user of browser 112 authorize HS1 104 to update the assertion (though authorization can be provided once allowing HS1 104 to automatically refresh the assertion). Expiring assertions preferably include a refresh element containing a URI to indicate where and how the assertion can be renewed. This URI is preferably used by HS1 104 to obtain an updated assertion that the user is a student in good standing from AS 110. Upon obtaining the updated assertion, the user information, including the assertions, is provided to browser 112 which is then redirected to MS 108, which in this case is the university library.

HS1 104 can provide a number of information release options to the user. When assertions, or other information, are changed from a previously stored value, HS1 104 can be permitted to automatically provide the new data. Another option is for an assertion to be released only if the assertion has not changed. Other variations will be well understood by those skilled in the art, as will the implementation of such a rule processing mechanism.

MS 108, upon receiving the user information, is provided third party assertions, including the assertion that HS1 104 is authoritative for the GUPI. The highest level assertion in a chain delegates asserting responsibility to the next highest level entity. This entity can delegate the asserting responsibility to another entity. This continues, until one of the entities asserts a property regarding the user. This decouples the trust and assertion relationships, but provides a simple mechanism for MS 108 to be assured that the data is properly asserted, though the entity making the assertion is unknown to MS 108.

Assertions can contain expiry dates that dictate when the assertion can expire, refresh properties that dictate how an expired assertion is updated, and delegation limits that dictate how many delegations can be made before MS 108 should not consider the assertion valid. Some entities dealing with confidential information may require that the assertions cannot be delegated more than a set number of times, so that the assertion is not misused.

Various techniques for obtaining updated assertions will be known to those skilled in the art. Such techniques include the use of a refresh URI in the assertion, and user redirection to AS 140 to re-obtain the assertion. In one embodiment, a refresh URI is provided and HS1 104 connects to AS 140 through a back channel and provides the user's GUPI, which AS 140 compares to a local database and determines that the GUPI is associated with expired certificates, and the user associated with the GUPI has authorized their automatic release to HS1 104, and resultingly issues refreshed assertions. In another embodiment, HS1 104 uses the refresh URI, provides the expired assertion and obtains a new assertion in its place. In a further embodiment, HS1 104 redirects browser 112 to AS 140 to authenticate and authorize the release of a new set of assertions. AS 140 can have different refresh rules for each assertion that it issues, so that assertions that a student is in good standing can be refreshed without user intervention, while assertions such as enrolment in a program require user validation that the assertion should be released.

One skilled in the art will appreciate that the identity management system of the present invention allows for the building of an analog to the trust models of the real world. A user is presented to MS 108 with a statement that the user is a particular individual. This statement is accepted because it comes either directly from a trusted source, or from someone who is delegated the responsibility to make the statement by a trusted source (HS1 104 is delegated authentication authority by root 102). Third parties can make assertions about the user. These assertions can be requested by MS 108, much as proof of membership in a program can be requested in the real world. However, due to its digital nature, the identity management system of the present invention can provide a higher degree of granularity for the information. While in the real world, a user may be able to obtain a discount upon proving that he is a student, this is accomplished by providing a student card, which provides a student number. In the identity management system, an assertion that a user is a student can be made without providing the student number. A user could also provide an assertion that they live in a particular city, without providing an address, whereas in the real world such an assertion would be validated by providing identification which typically contains a full address. As a result, the identity management system 100 of the present invention provides many analogs to the real world, but also offers a much higher degree of granularity to the information released.

Figure 6:
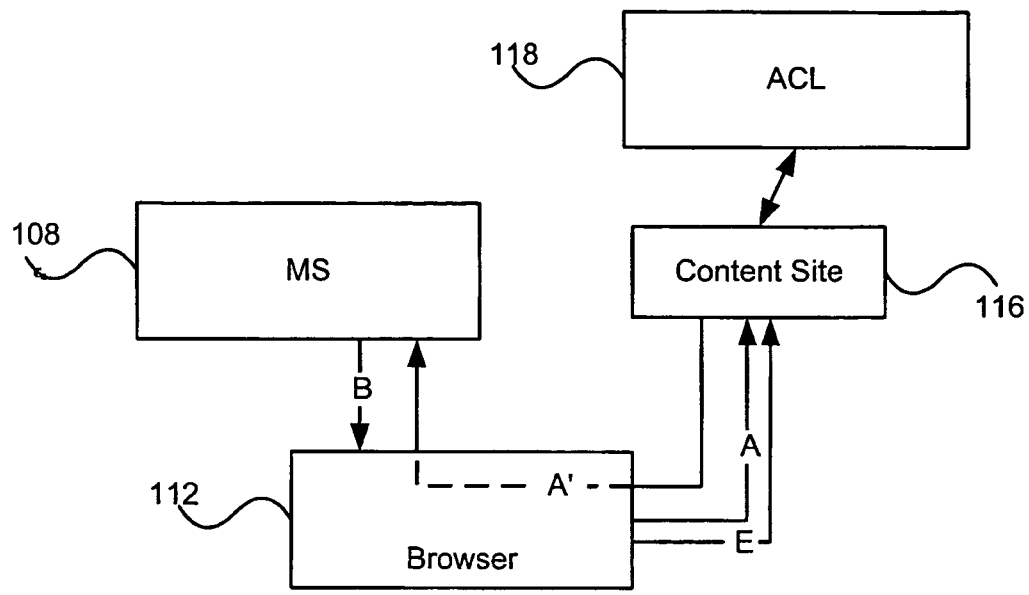
FIG. 6 is a block diagram illustrating the dataflow and network configuration for using a homesite to verify a user against an access control list.
Figure 7:
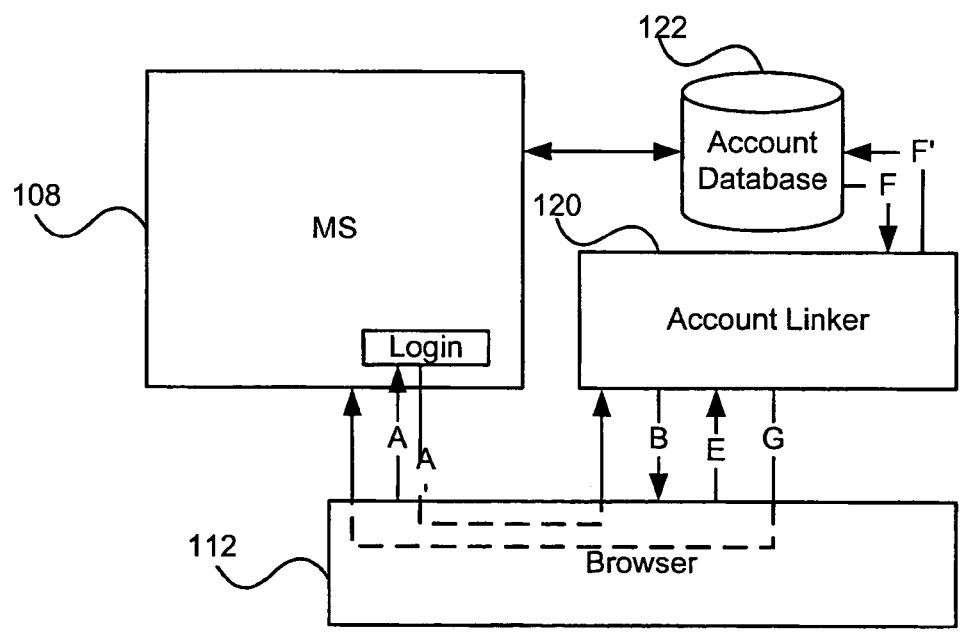
FIG. 7 is a flow chart illustrating a method of the present invention to link a GUPI to an existing account at a membersite.
Figure 8:
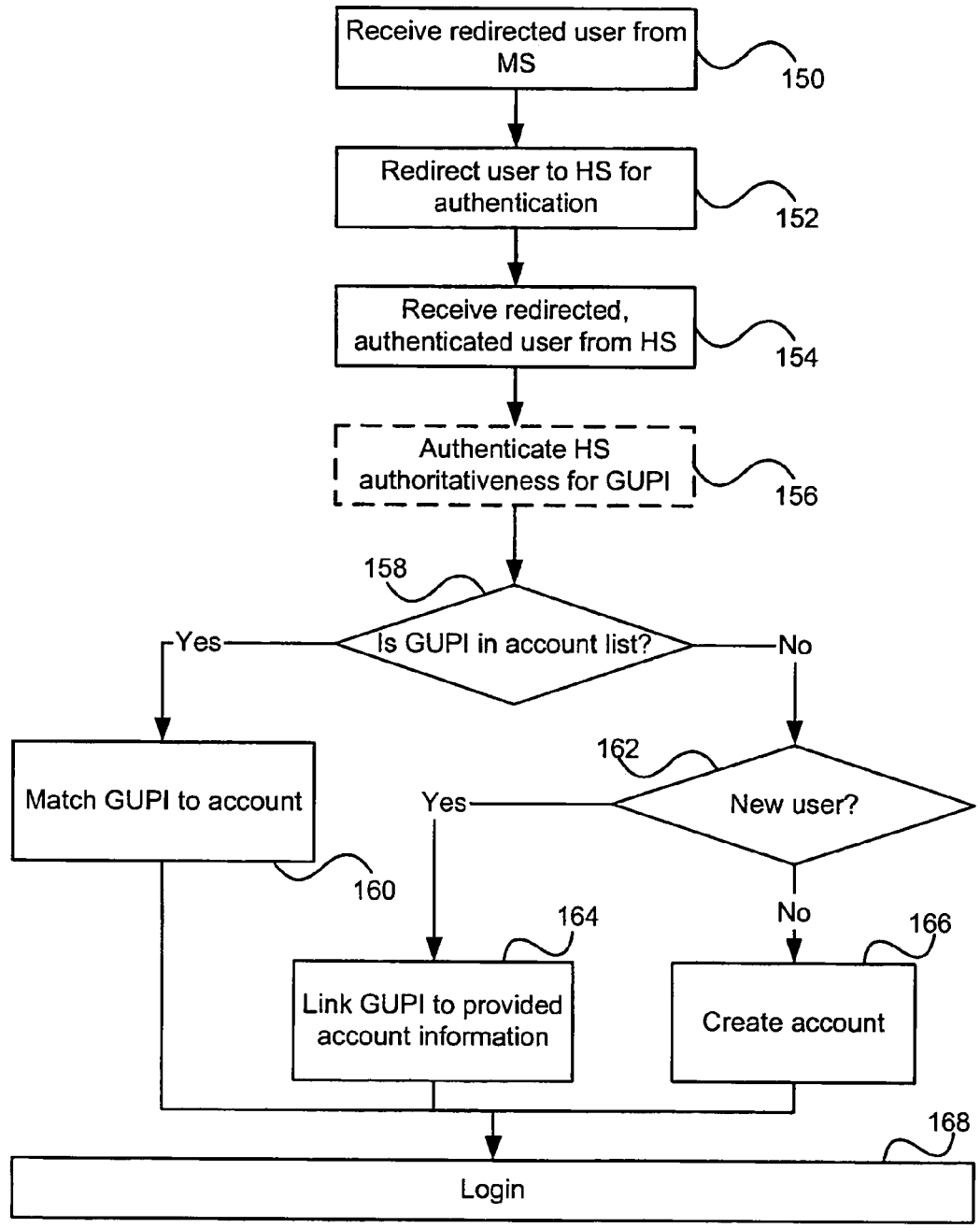
FIG. 8 is a block diagram illustrating the dataflow and network configuration for using the account linker module of the present invention.
Figure 9:
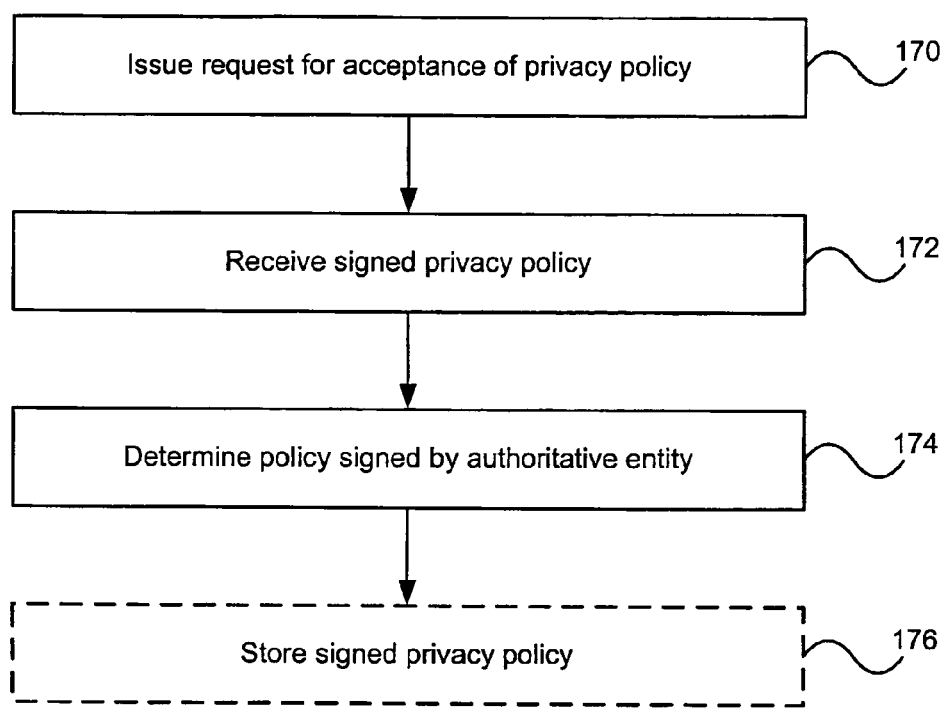
FIG. 9 is a flow chart illustrating a method of obtaining an authenticated user approval of a privacy policy.

It is common for websites, such as a personal photosites, to restrict access to a set of individuals, largely for privacy concerns. At present, this is commonly done through an obfuscated uniform resource locator (URL), under the assumption that because the URL is not published and is difficult to guess, only people who should know about the site will know where to go. Other more sophisticated systems include a username/password protection system, but this typically requires more system administration than is desirable for a small site, as each user would have to be authenticated prior to issuing a username/password pair. A solution to this is the use of an access control list (ACL) that stores identifying information, such as an email address. When a user attempts to access the photosite he or she is requested to provide an email address that is checked against the contents of the ACL. If the address is present in the ACL then the user is given access. To protect the user email addresses that are stored in the ACL it is common for the contents of the ACL to be stored solely as a hash, so that a malicious intruder cannot simply abscond with a copy of the ACL and determine who has access to the site. This solution, though simple, does not authenticate that the user is who he or she asserts to be, it simply tests that the user knows that a particular individual has access to the site. FIG. 6 illustrates a network configuration allowing a content site 118, such as the photosite, to employ the identity management network of the present invention. The login to the photosite 118 can make use of the identity management system by having the login managed by MS 108, a membersite in the identity management network 100. Upon visiting the photosite 116, the browser 112 indicates that its identifying information can be provided by HS1 104, using datapath A. This is typically accomplished by the user clicking on a link, but can be done in any number of other ways including the reading of a cookie indicating that the user prefers to use the identity management system 100. Photosite 116 redirects browser 112 to MS 108 over datapath A'. MS 108 guesses the correct HS, and redirects browser 112 to HS1 104 over datapath B. The information request from MS 108 to HS1 104 includes the address of photosite 116 as a return address. Upon authentication of the user, HS1 104 issues identifying information to the browser 112 which is forwarded to photosite 116 over datapath E. The identifying information is passed over datapath E to photosite 116 which can compare the information to the contents of the access control list 118. Often the information provided by HS1 104 is the user's email address, which may be hashed prior to being transmitted. By transmitting the user's email address as a hash, the identity of the user is protected against a third party attempting to eavesdrop on an unencrypted channel. One skilled in the art will appreciate that this reduces the administrative overhead of maintaining an ACL 120, and allows a simplified interface to be provided to a photosite operator to add to and delete individuals from the ACL 120.

Where prior art identity management systems do not provide a migration path from existing user bases to those supported by the identity management system, the present invention provides an account linker module that can be deployed in conjunction with MS 108 to allow an existing user base to be associated with GUPIs provided by the identity management system. FIG. 7 is a flowchart illustrating an embodiment of the process used by the account linker module, and is best understood in conjunction with FIG. 8 which illustrates a network overview of the account linker module.

Browser 112 initiates a session with MS 108, and indicates membership in the identity management system, as shown in data flow A. This indication of membership is typically performed by clicking on a link. This link redirects the user from MS 108 to the account linker 120, as shown by dataflow A'. Upon receipt of the redirected user, in step 150 account linker 120 guesses the user's homesite and redirects the user to HS1 104 for authentication, and optionally to obtain data, as shown in data flow B. Upon authentication of the user at HS 104 (not shown), the user is redirected to account linker 120 in step 152 as shown by data flow E. Account linker 120 optionally authenticates the authoritativeness of HS1 104 for the supplied GUPI in step 156. Account linker 120 then examines the GUPI and compares it to a concordance table linking GUPIs and existing account information, as shown in step 158. Preferably this information is stored in the user account database 122, this communication is illustrated in and dataflows F and F. If the GUPI has been seen before, it will have been linked to an account in account database 122, provided in data flow F', and the concordant account is used by the user to login in step 160, as shown by data flow G. If the GUPI has not been seen before, account linker 120 asks the user if he or she has an existing account in step 162. If the user indicates that there is an existing account, the account is linked to the GUPI in the account database 122, as shown in step 164, and in the future, when the GUPI is received it will be linked to the user account. If the user indicates in step 166 that a new account should be created, the new account is created in account database 122 and linked to the GUPI. After either linking the new GUPI to an account, or creating an account linked to the GUPI, the account linker 120 passes browser 112 back to MS 108 for login, as shown in step 168 and dataflow G. The passing of browser 112 to MS 108 for a login preferably is performed by account linker 120 sending a redirected post to browser 112. Browser 112 is then redirected to MS 108 and the userid and password combination associated with the GUPI in the account database 122 is provided, allowing browser 112 to bypass the login screen. MS 108 can then check account database 122 to verify the information, or can be passed a verification message along with the login request that can be verified by account linker 122.

Because the user is often releasing personal information that is protected by privacy policies, it may be important for the membersite to obtain user permission to release the information. Presently, to obtain user permission to release data the membersite would have to show the user a privacy policy, and ask the user to click a link to acknowledge agreement with the policy. Thus, if the membersite changes the policy they have no mechanism to show that the user agreed to the new policy or the old policy other than the date at which the data was provided. The user can also contest that new terms were added to the policy that were not agreed to in advance, as there is no reliable audit trail. In a present embodiment of the network of the present invention, permission can be obtained by providing the user a copy of a privacy policy, such as a Platform for Privacy Preference Project (P3P) compliant policy or a privacy statement, and asking that the user acknowledge the policy. It may also be important for the membersite to keep an audit trail showing that the user agreed to release the information. The network of the present invention provides a mechanism for doing so. When MS 108 redirects browser 112 to HS1 104, it can provide, as part of the redirection, a privacy policy, as shown in step 170. The privacy policy is received by HS1 104 in step 178, and can be text to be displayed by HS1 104 outlining the terms under which the user information will be released, it can be a universal resource indicator (URI) pointing to a privacy policy complying with the P3P standards, or it can be provided in other user displayable formats that will be understood by those skilled in the art. Prior to obtaining user permission to release the requested information, HS1 104 provides the policy to the user in step 180. The policy can be displayed in full, or a machine comparison of the policy to user specified rules can provide the user with a synopsis of the differences between the user-specified rules and the policy. HS1 104 then obtains user approval for the release of the user data in step 184, preferably after authenticating the user in step 182. One skilled in the art will appreciate that user authentication can occur prior to displaying the policy in step 180. Prior to HS1 104 redirects browser 112 to MS 108 in step 188, it signs the datablock returned to MS 108 containing the user information and the privacy policy in step 186. In different embodiments, the user information and the privacy policy can be separately signed, or as implemented in the presently preferred embodiment, they can be contained in the same XML fragment, which is then signed by HS1 104. This signed XML fragment contains the GUPI of the user, the user's information and the privacy policy and is received by MS 108 in step 172. Thus, MS 108 is able to determine that HS1 104 is authoritative for the GUPI, by looking for an assertion by root 102, and then can determine that HS1 104 signed the privacy policy on behalf of the user in step 174. This signed XML fragment can be kept by MS 108, as shown in step 176, to ensure that if future questions are raised, it can be proved that the user, through HS1 104, authorized the release of the data under the privacy policy.

Figure 10:
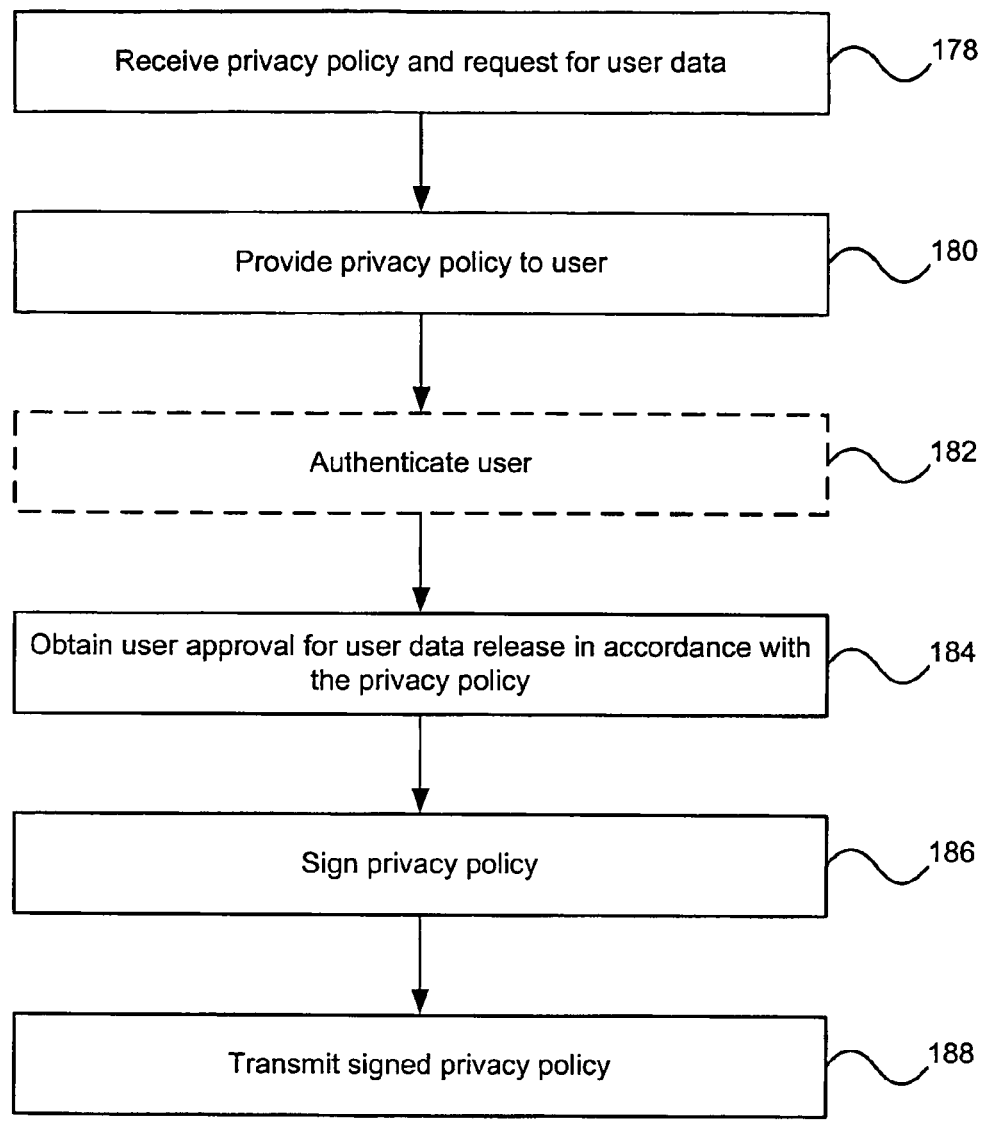
FIG. 10 is a flow chart illustrating a method of providing authenticated user approval of a privacy policy.

One skilled in the art will appreciate that a single user may elect to obtain a number of GUPI's for different online personas. Anywhere from one, to all of the GUPI's held by a user can be associated with a single HS. Thus, for multiple GUPI's, a user may elect to use a plurality of different HS's. Conversely, it may be advantageous for a use to make a plurality of HS's authoritative for a single GUPI. This allows for redundancy in the event that a HS is unavailable for technical or business reasons. It also allows for a user to provide only a subset of any information to a single HS, and use the different HS's in series to hold a complete profile. This is illustrated in FIG. 10, where both HS1 104 and HS2 106 are authoritative for a single GUPI associated with the user of browser 112. As the only evidence that either HS requires to prove that it is authoritative is a datablock containing the GUPI, and the HS identifier (hereinafter depicted as [GUPI, HSid]), signed by the root (signatures of a datablock herein after depicted as a superscript to the signed datablock, e.g. $[GUPI, HSid]^{root}$), both HS1 104 and HS2 106 can be made authoritative for a single GUPI. To initiate a plurality of HS's as being authoritative for a single GUPI, a user creates a first profile with HS1 104. HS1 104 collects information from the user and stores the data. Upon authenticating that the user wishes to associate his or her GUPI with HS1 104, root 102 provides $[GUPI, HSid(1)]^{root}$ to HS1 104. At a later time, the user visits HS2 106, and signs up using the same unique email address as was provided to HS1 104. Root 102, upon determining that there is already an authoritative entity for the provided email address, asks the user, preferably through an email, what to do. Typically the options are provided to the user as a series of embedded links in the email message. One of the options is to ignore the request, which simply terminates the scenario. Another option allows the user to revoke HS1 104's authoritative status, and designate HS2 106 as the authoritative entity. In this case root instructs HS1 104 to get rid of $[GUPI, HSid(1)]^{root}$, and provides to HS2 106 $[GUPI, HSid(2)]^{root}$. In the event that the user selects to add HS2 106 to the list of authoritative HS's, HS2 106 is provided $[GUPI, HSid(2)]^{root}$. To allow the user to bypass the manual entry of data, root 102 initiates a session with HS1 104 acting as a MS, and redirects the user to HS1 104 to authenticate him or herself. This authentication allows root 102, while acting as a MS, to request all the information associated with the user, and provide that information to HS2 106. In an alternate embodiment, HS2 106 can act as a MS, and request that the user authenticate himself with HS1 104 to get access to the profile stored by HS1 104. Allowing multiple HS's to be authoritative for a single GUPI provides the user redundancy in the event that one of the HS's becomes unavailable, and additionally allows the user to trust one subset of the profile to one HS, and another subset of the profile to another HS. When the user visits a MS, there are a number of different mechanisms that can be used to select which HS to use. If there is only one HS indicated by a cookie, the HS indicated by that cookie would become the default HS. Alternately, if a plurality of HS's are indicated by a cookie or a series of cookies, the MS can provide the user with a drop down list of the HS's indicated. If there is no cookie, or as a further option, MS can prompt the user to provide a HS name, such as homesite1.com, which is then mapped to the shadow domain name of homesite1.com.root.net if a shadow domain administered by the root is being employed to judge membership in the identity management system.

As multiple HS can be authoritative for a single GUPI, and the entire cert chain is provided to MS, a variety of different platforms can be used for a HS. One such platform is a locally executed service designed to hold data associated with a single user. A user with multiple devices could employ a multitude of different local HS's, so that a laptop computer would have an HS, as would a connectivity enabled cellular phone. An Internet based HS can serve as a backup, a fall back when not using the designated devices, or as a pivot point to synchronize data among the different local HS. As the user validation process relies upon an agreed upon method decided by the user and the HS, a locally executed application could rely solely upon the operating system login process to validate a user. All requests from a MS would be routed to the user's system and served by the locally executed application which would be set to receive requests at a defined port. In another embodiment, the local HS can reside on a peripheral device, such as a USB memory fob, or a Bluetooth enabled memory device. These devices can be portable, and include mechanisms such as Radio Frequency Identification (RFID) tags, or biometric readers to assist in the user authentication process. These devices could thus function in other environments too.

For a locally executed HS, the cookie would allow MS to perform a DNS request on a unique name such as localwallet.root.net, whereas a conventional HS would refer to homesite.com.root.net. The DNS entry for localwallet.root.net, or another such entry, are preferably mapped to either the CNAME value 'localhost' or to a loopback address. A search performed on cmd.localwallet.root.net would preferably result in a TXT entry of http://localhost:1234/commandscript, where 1234 is a predetermined port on which the locally executed HS listens, and commandscript is a script used to receive and transmit information to MS. Such a local HS need not rely upon the creation of a web based login process, and can use any number of options, including the use of a locally executed application to obtain identifying information, or the reliance upon the user's login to the computer used.

As the management of the root.net domain allows for a near infinite number of subdomains, a plurality of different local HS products can be sold. Each of the local HS's can then be assigned any non-top level domain base name, to allow coexistence of a plurality of different local HS's, each of which preferably use a different port to allow their co-existence on a single computer. Two users with the same local HS application, would both be using the same DNS entry, but sent to different local computers. To address privacy concerns each local HS provider can use a plurality of different HS certs, so that preferably no two local HS's use the same cert. The local HS cert is then signed by the local HS vendor, whose cert is signed by the root. This allows MS to validate the user information through the validation of the cert chain. If the vendor cert is time limited and is provided with an expiry date, the GUPI can be associated with a unique serial number attached to the local HS, so that if a physical device containing the HS is reported lost, the lost HS can only be used until the HS vendor cert expires. In another embodiment, the near infinite domain space in an identity management network shadow domain can be employed to assign each locally executed HS with its own DNS entry, preferably assigned during the initiation of the locally executed HS. If such a HS is lost, the domain can be removed from the DNS system, providing deactivation of the HS in short order.

Version control of functionality associated with the identity management system can be provided through the use of the DNS entries associated with the HS. If there are two versions of the identity management system, assuming for the sake of simplicity that they are backwards compatible, a MS supporting both version 1 and version 2, upon receiving indication from the user that they want to be authenticated by HS_alpha.com, can perform a DNS lookup on cmd2.hs_alpha.com.root.net to determine if version 2 is supported. If the DNS lookup fails, MS can perform the DNS lookup of cmd1.hs_alpha.com.root.net to determine which address the user should be redirected to. The difference in versions can be used to support a richer data schema, a differently organised data schema, and to implement novel features. If a particular feature is provided by a subset of HS's, and is considered to be version independent, a DNS entry mapping feature.HS_alpha.com.root.net to a valid address can be provided to indicate that the desired features is supported. In an alternate embodiment, the HS identifying cookie can indicate the features and versions supported to MS.

Alternately, an HS can transmit as a property of the XML document a date associated with the schema used to store the user's data. If an MS receives a response that does not include the requested information, and the schema date is earlier than the date on which the field for the data was added to the schema, it can be determined that the user does not have that information stored at the HS. This would allow the membersite to recognize that the information was not stored, and allows the membersite to ask the user for the information, without worrying that the data was not provided by choice.

It may be desirable to provide an alternate method of authenticating a user at a HS. Typically an HS will store, as part of the user profile, contact information which can include a telephone number. An HS can allow for out of band authentication of a user through the use of a system that would call a user at a designated number, such as a cellular phone number, and request proof of authentication. One such type of proof of authentication is simple possession, on the assumption that if a user designates a phone number as authoritative and secure then other parties do not have access to the number without permission. In the case of a cellular phone, a lost phone can be reported stolen and all calls to it would be disabled, and authentication over that channel would be disabled. In an alternate embodiment, the user would receive an automated call and be required to provide a numeric sequence, such as a personal identification number (PIN), using the dual-tone-multiple-frequency (DTMF) telephone keypad. One skilled in the art will appreciate that using such a mechanism, the HS could additionally prompt the user for the telephone number to be reached at, so that while travelling, or simply at a location away from the designated phone, another phone number can be used. In a further embodiment, the out of band authentication requires information other than a PIN, such as a request for a birthdate, street address of a familiar location, or other such information. The HS can select which question the user is asked from a list of provided questions and answers, so that there is a higher likelihood that the user has in fact been asked information that only he or she knows. In a further embodiment, the out of band authentication can be a telephone call from a live operator asking for detailed information, such as a mother's maiden name, or a pet's name. The out of band connection, however it is established, preferably performs authentication through the use of a shared secret that is validated during the exchange.

To facilitate synchronizing data between homesites, each field in the schema used to store user information can be provided with a corresponding serial number or date, which is updated when information is changed. Alternatively each entry can be timestamped. The user of either serial numbers or timestamps allows homesites to determine which entry corresponds to the newest data, and synchronize using the newest data. It also allows a membersite to request an update of information by sending either a serial number or a timestamp along with a request for any information newer than the transmitted value. One skilled in the art will appreciate that though there are many different known methods used to synchronize data, none of these techniques are traditionally employed to synchronize between a plurality of homesites.

A user having visited MS 108 and provided data through authentication with HS1 104, can instruct HS1 104 that the data provided to MS 108 be kept up to date. To facilitate this update, MS 108 can send HS1 104 a request for updated information along with the authentication request sent in accordance with another login. This request for updated information can include the date on which the information was last provided. HS1 104 can then determine whether or not the information has been updated. If the information has been updated, the user can be prompted to provide permission for the release of the updated information, or the user can have previously provided permission to release updated information whenever appropriate.

To facilitate these requests for updated information, MS 108 can provide the request as an XML query, and receive an XML reply. This request can be made at the time of a user login, so that a user visiting an e-tailer with whom he has already established an account will be directed to HS1 104, along with a request indicating that all information newer than a given timestamp, or more recent than a provided serial number, be provided in the response. In an alternate embodiment, MS can provide the HS with a hash of currently stored information, and HS1 104 will transmit the user information only if the stored information does not correspond to the hash, and permission has been obtained from the user. Thus, if a user changes addresses, at the first visit to an e-tailer after moving, HS will provide the updated contact information, preferably after confirming transmission of the data with the user, to the e-tailer so that that user's new information is propagated with the user's browsing habits.

Each HS can support a plurality of different authentication mechanisms for a single user, so for two HS, each authoritative for the same GUPI, the user could potentially be authenticated differently by each HS. In the event that there are two GUPI hosted by a single HS, each of the GUPI could be associated with a different authentication.

The support for different authentication mechanisms allows the user profile to reflect how the user authenticated. Thus, different authentication methods can be offered for a single GUPI. Certain membersites, including but not limited to banking and financial sites could then require that the user authenticate with a high security authentication before a login is permitted to the membersite. Thus, a homesite could offer a user the ability to login using a simple username password combination, a username password combination with certain qualifications on the password including length and the existence of special characters or case sensitivity, or a secure identifier string generated by a hardware device such as a conventional security fob. This would allow varying degrees of security to be associated with different parts of a user persona, linked to different GUPIs. Thus, different authentication mechanisms allow a user to use a "light" security login for low security tasks, such as logging into news sites, but have more robust authentication for logging into intranets and performing other tasks such as online banking. The different degrees of security attributed to each authentication can also optionally be accredited by a third party which can then provide an accreditation to a homesite based on the relative security of the user authentication mechanism. Such an accreditation can be sent to a membersite along with the user information, to certify that a secure login was performed.

Sending information between the HS and MS after user authentication can take place through either a backchannel or through sending the information through the user. When the user visits MS 108 an SSL connection is established. When redirected to HS1 104 another SSL connection is established. One skilled in the art will appreciate that there is a time and computational overhead associated with the establishment of an SSL connection, and that these connections are persistent in a time limited fashion. With redirection between MS 108 and HS1 104, the already established SSL connections can be used so long as the timeout period for the SSL connection has not expired. Thus, if HS sends the information to MS via user redirection no new SSL connection is required. However if HS1 104 uses an SSL backchannel to MS 108 a new SSL link is required. This introduces additional overhead. In addition to the overhead, MS 108 needs a mechanism to authenticate that the new backchannel connection is with the homesite associated with the user that a nonce was assigned to. This introduces a possible security concern, as MS must secure another open port to prevent a malicious third party from poking around.

If a user, after establishing the SSL connections to MS 108 and HS1 104, visits a second MS, referred to as MS2, there is likely still an SSL connection to HS1 104, so there is no need for the re-establishment of the SSL link to HS1 104. In the worst case scenario, where no authentication occurs within the lifespan of the SSL link to an MS, the use of user redirection has the same overhead as the use of a backchannel, but for each HS to MS backchannel avoided, there is the possibility of one fewer SSL connection required.

Figure 11:
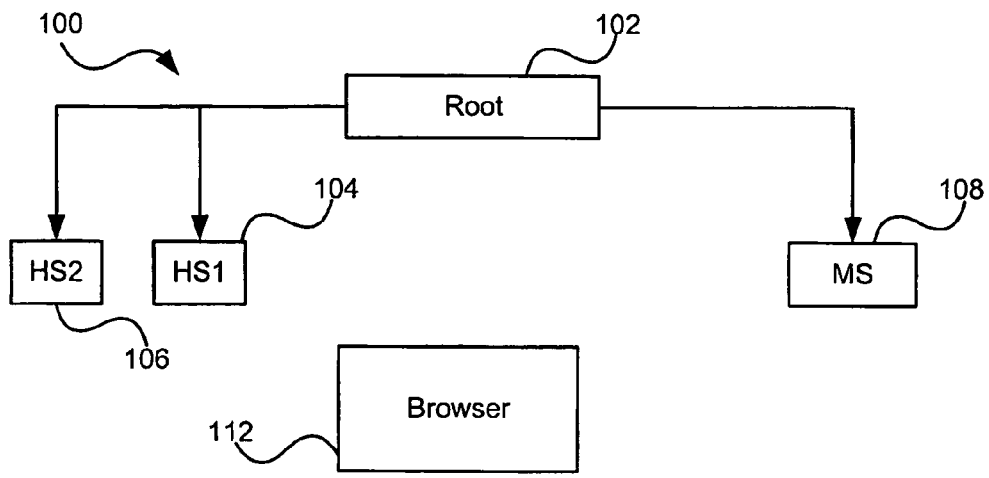
FIG. 11 is a block diagram illustrating the use of multiple homesites.
Figure 12:
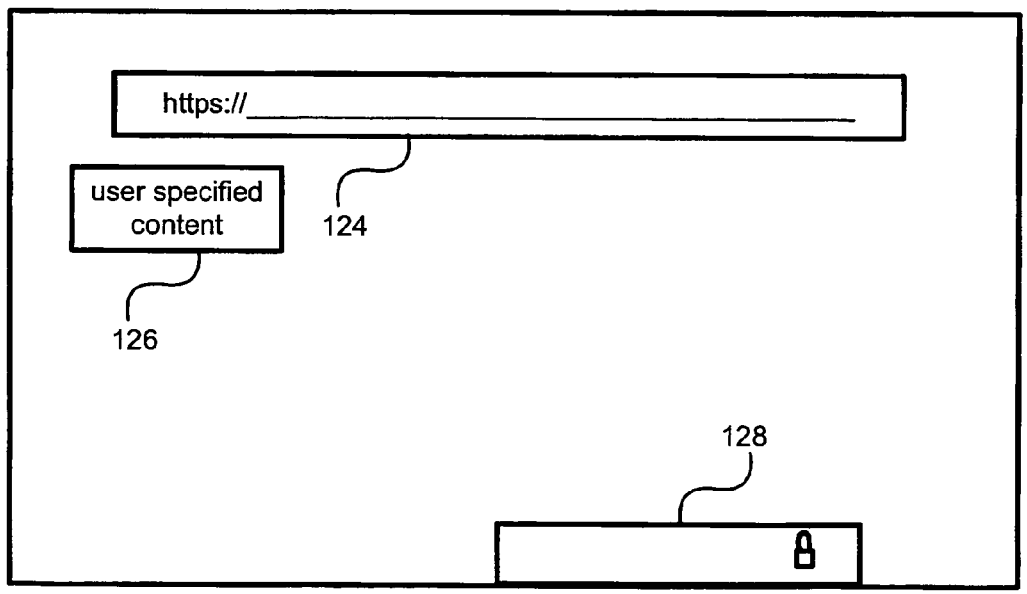
FIG. 12 illustrates a site security system of the present invention.

One question that has arisen is the question of how a user can authenticate that he has been redirected to the correct HS. One skilled in the art will appreciate that FIG. 11 includes prior art verification mechanisms, and an additional security feature. When a user connects to a secure server the address, preceded by 'https://' is displayed at 124, and when the secure channel is established a lock 128 is displayed by the browser. However, the lock merely indicates that the channel is secure, and relies upon the user to examine the address 124. Most users give only a furtive glace at 124, and thus miss misspelled addresses. As a result, a malicious site, impersonating a MS could redirect the user to a fake HS that is mocked up to appear like the user selected HS. So long as the fake HS has a similar domain name and runs a secure server, many users will end up giving up their identifying information. The present invention provides a mechanism for providing user specified content 126 on the front page of the HS that will be difficult to reliably mock up for a fake HS. Though user specified content in the form of an image selected by the user from a list has previously been taught by PassMark Inc., other user specified information can be utilized to make a site more resistant to impersonation. User defined content 126, such as a user defined pass phrase that the user has created, that the HS displays upon reading the HS cookie from the user is more difficult to fake than an image selected from a list. Images selected from a list can be simply rotated between, or a single image can be used, and a certain percentage of users will end up with the image that they had selected. However, user created content, such as a pass phrase, is far more difficult to fake. A fake HS would not have access to the cookie, and would thus not be able to determine the identifier linked to the pass phrase. One skilled in the art will appreciate that the entire pass phrase, or a simple numeric identifier that the HS can link to the pass phrase in a lookup table would enable such a user specified display.

In an alternate embodiment, another form of user defined content 126 is provided through the use of a browser plugin. It is common for secure websites to provide an identifying logo on their front page. This logo cannot be relied upon to indicate the correct site however, as any user who establishes the connection can get a copy of the logo for placement on a fake page. However, the logo can be rendered by a plugin, or supported natively by a browser, and be provided in a new graphical image format, as an extension to an existing format, or as another data type including an XML file referencing both the image and other data. Included in the image file is a reference to the URL 124 that should be displayed on the page showing the logo. During the rendering process, the browser or plugin compares URL 124 to the URL provided by the logo, and if they match provides a user defined behavior, this behavior can either supplement or serve as the user defined content 126. This behavior may include a special visual rendering, such as a cycling of the colours in the logo and causing the colour intensity to increase and decrease, the cue may include the playing of an audio file specified by the user, and the cue may include activation of force-feedback through an input device such as a mouse, so that when the mouse is pointed to the logo it vibrates. As this cue is defined on a user by user basis, it makes creating a fake website considerably more difficult. To prevent a malicious user from carefully rendering the logo and attaching a different URL to it, the browser or plugin can be designed to provide the user defined behavior, if and only if the logo is signed by a trusted authority such as a known certificate authority. Thus, to impersonate a HS, or other secure website, a malicious third party would be required to get a similar domain name, run a secure server attached to the domain name so that the browser will indicate a secure connection, mock up a logo, and have a trusted certificate authority associate the logo with the domain name and sign the logo. The involvement of the trusted authority makes the impersonation of the website much more difficult.

In prior art distributed identity management systems, setting up identity stores is a difficult and time consuming process. Services, such as those offered by homesites, may be offered by internet service providers or other such entities wishing to offer these services. However, setting up a homesite can be technically difficult, or at least undesirable, for some of the potential HS service providers, who are typically more interested in off the shelf deployments, which can easily be integrated into an existing environment. Such an off the shelf solution also allows for an HS embodiment that can address security concerns regarding user data. Furthermore, the service offered by a homesite service provider inherently includes storing private user data. Many service provides do not want to assume liability for storing such sensitive data. As the homesite grows, more personal data is stored, and the homesite becomes a bigger target for someone looking to compromise the integrity of the user data store. To maintain a low likelihood of a security breech, the system of the present invention provides for a secured network appliance offering homesite services. By purchasing a dedicated homesite server, a service provider can obtain an off the shelf tested appliance that offers a high degree of security. For the vendor of such an appliance, it may be considered feasible to assume liability for an up-to-date appliance, which is unlikely to be the case for a pure software sale. This allows liability to be shifted to the appliance vendor, who would then make available a secured and sealed appliance that does not allow for user tampering.

To securely store user data on an external storage device, long encryption keys can be used, making a brute force decryption overly difficult. However, the key store must be properly secured. Furthermore, conventional identity data stores encrypt all data using the same key to avoid having to manage a vast number of unique keys and the associated key management issues.

Figure 13:
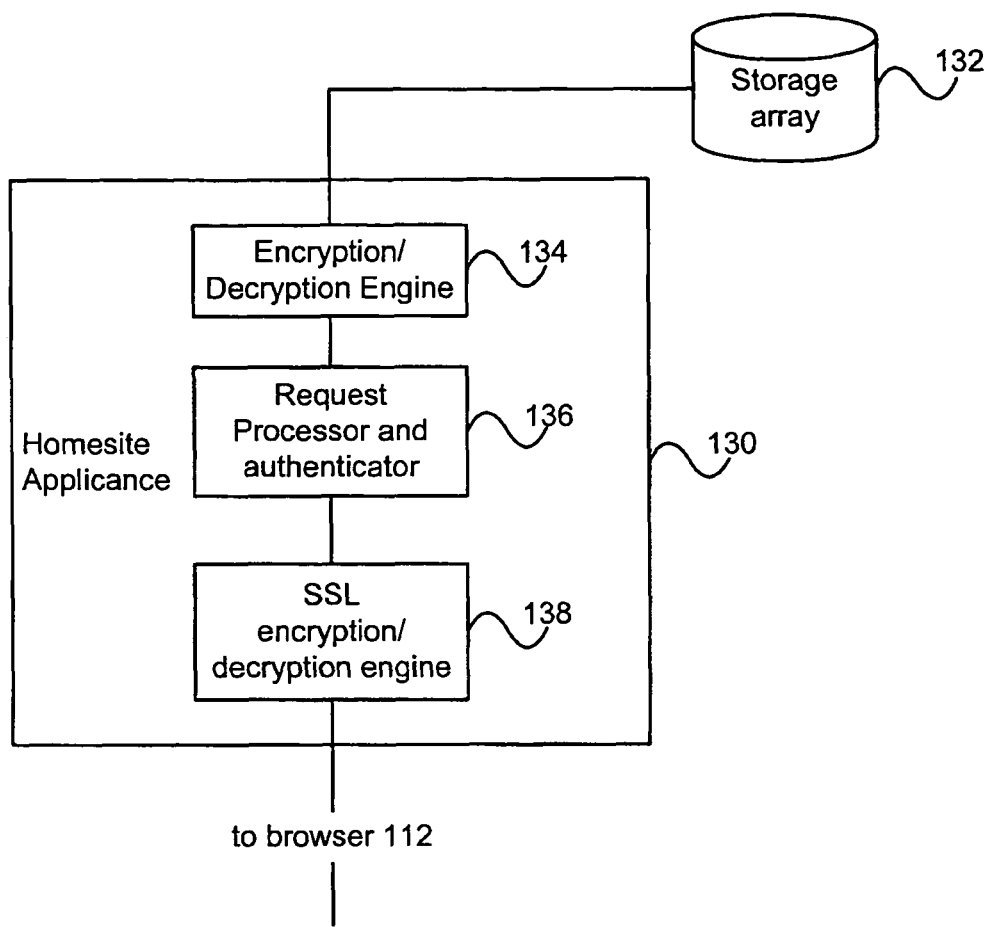
FIG. 13 illustrates a homesite appliance of the present invention.

In an embodiment of the present invention, the modular nature of computing systems is employed to provide a scalable and easily deployable embodiment of the homesite. Many HS service provider candidates already employ modular computing systems, often referred to as computing appliances. Such an embodiment is illustrated in FIG. 13. Homesite appliance 130 can be built around standard hardware and provided with network accessibility. The counterpoint to using standard hardware is that the selection of hardware can be made to provide a platform meeting the needs of a service provider. Such an appliance can provide a balance between power consumption and computing power, and the software executed by the appliance 130 can be optimized for the computing platform that appliance 130 is based on. In a presently preferred embodiment, homesite appliance does not store user profiles on a local storage device, and instead stores them on a distinct storage array 132. Storage array 132 can be network attached storage that can allow for modular additions to the system allowing the homesite service provide to grow the storage as needed.

Some users may have a concern about the security of their personal information being centrally stored by a homesite. To accommodate this concern it is possible to store the user data in encrypted form on storage array 132. The encrypted data can then be decrypted on an as needed basis by homesite appliance 130. Because much of the user data is transmitted over an SSL channel, the data is only decrypted inside homesite appliance 130, which can be designed to prevent tampering using standard mechanisms. As a result, even the homesite service provider will not have access to the user data. To manage the encryption of the user data, homesite appliance 130 can include an encryption decryption engine 134. Engine 134 can use symmetrical encryption and can store only a portion of the key, allowing the user to input a passphrase that allows the key to be completed. This splitting of the key in two segments allows the user control of when personal information is disclosed, because without the passphrase the decryption of the stored information cannot occur. Engine 134 can employ dedicated logic and circuitry to perform encryption and decryption of the data faster than a general purpose processor would. Connected to the engine 134 is request processor and authenticator 136. Request processor and authenticator 136 authenticates the user, and processes the membersite requests for data. One skilled in the art will appreciate that processor and authenticator 136 can be implemented as software executed on a general purpose hardware platform. The software executed by processor and authenticator 136 is preferably optimized for the hardware platform used. Such an optimization allows for rapid handling of user authentication and data processing. To reduce the computational load on processor and authenticator 136, the SSL encryption of outgoing data can be performed by a dedicated SSL encryption/decryption engine 138. One skilled in the art will appreciate that such an engine, hereinafter referred to as an SSL engine, can be designed to rapidly encrypt and decrypt with the public key technology used in the SSL process. One skilled in the art will appreciate that the homesite appliance of the present invention can be implemented using a single generic hardware assisted encryption/decryption engine 135 to perform the function of SSL engine 138 and encryption engine 134. In alternate embodiments, the SSL engine 138 is omitted and the SSL encryption is performed by the same general purpose processor as is used for authenticator 136.

Such an appliance 130 allows a homesite service provider to simply add a component to an existing network and be able to offer a high performance homesite. In embodiments of the appliance 130, further variations are implemented to allow further performance benefits. In one such embodiment, when a user's data is retrieved and decrypted from the storage array, request processor and authenticator 136 can store the decrypted user data in an adjoining memory so that further requests from the user during the same session do not require retrieving and decrypting data from an external source. In another embodiment, the modular nature of the homesite appliance 130 is used to create a homesite, such as HS1 104, using a plurality of homesite appliances. This plurality of homesite appliances can be load balanced, and set up to access the same storage array, so that a user can be directed to any of the homesite appliances and still be able to retrieve the user information. Furthermore, if a user is directed to the same homesite appliance 130 selected from the plurality, the prefetched and decrypted user data can be accessed without leaving the homesite appliance 130, which reduces the time required to access the user profile.

The combination of the appliance design, and the encryption used to store user data, without storing the full decryption key, allows a homesite to offer secure storage to a user. In such a design, the homesite appliance 130 is unable to decrypt the data without user participation.

The homesite appliance of the present invention can provide hardware acceleration for suitable tasks to allow for a more efficient design, and as well provides enhanced security, which appeals to be homesite service providers and users. Homesite service providers can obtain assurances of security, and reduce the administration time to ensuring that appropriate security patches are applied. Users can be assured of the security of their data through the use of the storage side encryption, and by an assertion of security issued by a trusted authority.

In operation, a user provides user identity information to appliance 130 for storage. Appliance 130 stores a GUPI and user authentication information along with user identity information, so that the user associated with the GUPI can be later authenticated. At a later point in time the user can revisit the appliance and either provide more user identity information, or can request that the appliance 130 release information. The request processor 136 receives this request for information release and preferably obtains user authorization for the release. The information is retrieved and extracted from the schema, preferably after retrieval from storage array 132, using a storage array interface, and decryption by engine 134. The decrypted data is preferably stored in a volatile memory which functions as a cache. The extracted data is then transmitted to the membersite requesting the data, preferably via redirection of browser 112. In a presently preferred embodiment, either generic encryption assist hardware 135 or SSL encryption engine 138 is used to encrypt the data prior to it being sent to browser 112. Appliance 130 also preferably includes an authoritative site interface to allow direct connection to an authoritative site to refresh or obtain an assertion, as well as an assertion checking module, which can be optionally included in request processor 136, or executed as a separate software application by the same hardware processor, for checking assertions for validity and expiry.

The schema used in identity management system 100 is defined by the root, and shared with both membersites and homesites. The schema is used by homesites, such as HS1 104 and HS2 106 to store user data, and is used by membersites, such as MS 108, to determine what data can be requested. A schema designed so that it can be expanded but never contracted, allows for a homesite to decide to not upgrade to a newer version of the schema, but at the same time still retain the ability to provide any stored user data to membersites without fear of incompatibility between the schema. Furthermore, when a schema is updated, a membersite that is already retrieving all the information that it wants will not need to consider the updated schema as relevant.

A homesite that adds new elements to the schema, does not have to prompt a user to add the data immediately. The user only needs to add the data when a membersite requests it. Thus, when MS 108 requests information about a user that is not stored in HS1 104, HS1 104 can ask the user to provide this information. The information can then both be stored in the user profile and transmitted to MS 108. This allows a just-in-time building of the user profile. The same technique can be used when the user is first registered into the network 100, allowing a user to provide no information other than an email address to create a profile and obtain a GUPI.

Because the schema used to store the user profile is preferably an XML document, the user information in the schema is preferably related to a name or property field. The names of these properties, hereinafter referred to as a schema names, can be mapped to user friendly names applied by the homesite, and preferably offered in different languages. When the schema is updated, a homesite can be provided with an easy to manage upgrade path to offer support for the schema. A mapping between schema names and user friendly names in different languages can be offered through the use of schema name mapping templates, such as those available through conventional Extensible Stylesheet Language Transformations (XSLT) techniques. An XSLT processor can be provided with an XSLT template that includes translations for the various schema names. A homesite can alter the XSLT template to customize it, or the XSLT template can be used in conjunction with another template to convert the standard schema into a document that can be viewed by the user. Because XSLT processors can read an XML document and write the data to another markup language format, a local language specific XSLT template can be used to translate the schema to a different language, and a homesite specific XSLT template can then be used to translate the local language schema to an HTML document for sending to users. This can either be done on the fly, or it can be done in advance for a number of pages to reduce the processing load on the homesite.

Membersites can request data in a rich format using XML Path Language (XPath) commands. One skilled in the art will appreciate that XPath commands allow a membersite to conditionally query the user's schema for information. For example, if the user's name, birthdate, and academic history are stored in the profile, MS 108 could request a user's name and birthdate. Alternately, MS 108 could request the user's name, birthdate, and date of university graduation only if the academic history indicated that the user had graduated from a university. MS 108 could also request the date of the most recent university graduation if there are more than one. Such structured queries allow for rich data requests which return rich XML responses. The homesite is also able to examine the XPath request and determine if it will return valid data for a user. This examination allows the homesite to prevent XPath requests that will return error messages or invalid data. XPath requests are used in the presently preferred embodiment because they allow for both simple and rich requests, and allow the homesite to handle only one type of request.

When XML fragments are transmitted from HS1 104 to MS 108 through browser 112, a simple mechanism is preferably selected as a standard transmission mechanism. In a presently preferable embodiment, the XML fragment is URL encoded and becomes a name value pair to be transmitted to MS 108 via a redirected post (as described above). The XML fragment as generated by HS1 104 contains the information requested by MS 108. To provide this information to MS 108 through browser 112, the browser is send an HTML page containing the XML fragment, preferably in a hidden field. The HTML page contains a post link, which can be automatically executed in the case of the redirected post, designed to post the XML fragment to MS 108. The use of the HTML post allows for large XML fragments, possibly including a series of assertions and other rich data, to be provided to MS 108 without the use of a back channel.

Requests sent by MS 108 to HS1 104 are preferably URL encoded as name value pairs, where one value is and XML fragment. The rich response comes back to MS 108 as a name value pair, where a value is an entire XML fragment containing the requested data. A simple check on the response, performed by MS 108, can determine if the response is validly formatted or is part of a distributed denial of service attack. If a content check is performed on the name value pairs and reveals that the response is invalid, further analysis of the XML code is unnecessary Assertions and delegations of authority are described above. The present invention provides a novel mechanism to store assertions and chains of assertions. Conventional security markup languages, such as SAML, can be used to store assertions in the user profile. However, SAML stores the data being asserted inside the assertion, which is digitally signed for authentication purposes. Such as structure is illustrated below.

```
<profile>
    <assertion1>
        <data1 />
    </assertion1>
    <assertion2>
        <data2 />
    </assertion2>
</profile>
```

Thus, for a system like MS 108, to read the data contained in the assertion, the assertion schema must be understood for the data can be read. This could mean requiring every membersite to support signed assertions so that they can access the data in the assertion. An alternate embodiment is also presented that does not require decoding an assertion to access the asserted datablock. The schema structure illustrated below has data inline with the related assertions instead of being inside the assertion.

```
<profile>
    <data1>
        <datablock>
        <assertion of datablock />
        <digital signature />
    </data1>
</profile>
```

This allows the assertion to be separated from the datablock being asserted. As a result a business rule can be processed on the data without giving it the ability to verify the assertion. All assertions can be verified using a generic assertion checker that checks the assertion for validity, and checks the delegation chain. The decoupling of the data processing and assertion verification additionally allows for the context of a data element nested in other data elements to be maintained, whereas if it is embedded in an assertion the context of the data is lost. By keeping assertions inline with the data, instead of the data inside the assertions, a single method of requesting information, by its node, is available, thus simplifying the membersite-homesite interactions. Furthermore, data, along with the accompanying assertions, is received as a rich XML fragment, as opposed to being received as a series of assertions, each of which contains data.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of obtaining user information, the method comprising:
   receiving, at a server through a data network from a device associated with a user, a request for access to a service;
   transmitting, from the server through the data network to the device associated with the user, a request for the user information;
   receiving, at the server through the data network from the device associated with the user, a location identifier associated with a network location where the user information can be obtained;
   providing, from the server through the data network to the device associated with the user, a communication including a session identifier and a link to the network location where the user information can be obtained;
   receiving, at the server through the data network from the device associated with the user, the user information and the session identifier;
   correlating, at the server, based on the session identifier, the user information to the request for the user information; and
   fulfilling, by the server, based on the received user information, the request for access to the service.

2. The method of claim 1 further comprising:
   transmitting, from the server through the data network to network location where the user information can be obtained, a request for a certification of the user information; and
   receiving, at the server from the network location where the user information can be obtained, the certification of the user information.

3. The method of claim 2 further comprising:
   transmitting, from the server through the data network to a root device with an established trust relationship with the server, a request to verify the certification of the user information;
   receiving, at the server from the root device, verification of the certification of the user information; and
   verifying, by the server, based on the verification of the certification of the user information, the user information.

4. The method of claim 1 wherein receiving the user information and the session identifier comprises receiving a user identifier and a timestamp.

5. The method of claim 1 wherein the user information comprises user authentication information.

6. The method of claim 1 wherein the link is provided as a redirect that redirects the device associated with the user to the network location where the user information can be obtained.

7. The method of claim 1 wherein the user information provided is an XML block or fragment.

8. A storage medium, comprising hardware and/or a memory, storing instructions that, when executed by a computing system, cause the computing system to perform operations for obtaining user information, the operations comprising:
   receiving, at a server through a data network from a device associated with a user, a request for access to a service;
   transmitting, from the server through the data network to the device associated with the user, a request for the user information;
   receiving, at the server through the data network from the device associated with the user, a location identifier associated with a network location where the user information can be obtained;
   providing, from the server through the data network to the device associated with the user, a communication including a session identifier and a link to the network location where the user information can be obtained;
   receiving, at the server through the data network from the device associated with the user, the user information and the session identifier;
   correlating, at the server, based on the session identifier, the user information to the request for the user information; and
   fulfilling, by the server, based on the received user information, the request for access to the service.

9. The storage medium of claim 8 wherein the operations further comprise:
   transmitting, from the server through the data network to network location where the user information can be obtained, a request for a certification of the user information; and
   receiving, at the server from the network location where the user information can be obtained, the certification of the user information.

10. The storage medium of claim 9 wherein the operations further comprise:
    transmitting, from the server through the data network to a root device with an established trust relationship with the server, a request to verify the certification of the user information;
    receiving, at the server from the root device, verification of the certification of the user information; and
    verifying, by the server, based on the verification of the certification of the user information, the user information.

11. The storage medium of claim 8 wherein receiving the user information and the session identifier comprises receiving a user identifier and a timestamp.

12. The storage medium of claim 8 wherein the user information comprises user authentication information.

13. The storage medium of claim 8 wherein providing the communication including the session identifier and the link comprises providing a redirect that redirects the device associated with the user to the network location where the user information can be obtained.

14. The storage medium of claim 8 wherein the user information provided is an XML block or fragment.

15. A system for obtaining user information, the system comprising:
    one or more processors; and
    a memory storing executable instructions that, when executed by the one or more processors, cause the one or more processors to perform operations for obtaining user information, the operations comprising:

receiving, at a server through a data network from a device associated with a user, a request for access to a service;

transmitting, from the server through the data network to the device associated with the user, a request for the user information;

receiving, at the server through the data network from the device associated with the user, a location identifier associated with a network location where the user information can be obtained;

providing, from the server through the data network to the device associated with the user, a communication including a session identifier and a link to the network location where the user information can be obtained;

receiving, at the server through the data network from the device associated with the user, the user information and the session identifier;

correlating, at the server, based on the session identifier, the user information to the request for the user information; and fulfilling, by the server, based on the received user information, the request for access to the service.

16. The system of claim 15 wherein the operations further comprise:

transmitting, from the server through the data network to network location where the user information can be obtained, a request for a certification of the user information; and receiving, at the server from the network location where the user information can be obtained, the certification of the user information.

17. The system of claim 16 wherein the operations further comprise:

transmitting, from the server through the data network to a root device with an established trust relationship with the server, a request to verify the certification of the user information;

receiving, at the server from the root device, verification of the certification of the user information; and verifying, by the server, based on the verification of the certification of the user information, the user information.

18. The system of claim 15 wherein receiving the user information and the session identifier comprises receiving a user identifier and a timestamp.

19. The system of claim 15 wherein the user information comprises user authentication information.

20. The system of claim 15 wherein providing the communication including the session identifier and the link comprises providing a redirect that redirects the device associated with the user to the network location where the user information can be obtained.

* * * * *